United States Patent
Dupuis et al.

(10) Patent No.: US 7,266,195 B1
(45) Date of Patent: Sep. 4, 2007

(54) SURGE CLAMP PROTECTION CIRCUIT

(75) Inventors: Timothy J. Dupuis, Austin, TX (US); Charles D. Thompson, Buda, TX (US)

(73) Assignee: Silicon Laboratories Inc., Austin, TX (US)

( * ) Notice: Subject to any disclaimer, the term of this patent is extended or adjusted under 35 U.S.C. 154(b) by 441 days.

(21) Appl. No.: 10/379,367

(22) Filed: Mar. 4, 2003

(51) Int. Cl.
*H04M 1/00* (2006.01)
(52) U.S. Cl. .................................. 379/412; 379/399.01
(58) Field of Classification Search ........... 379/399.01, 379/412
See application file for complete search history.

(56) References Cited

U.S. PATENT DOCUMENTS

| | | | |
|---|---|---|---|
| 4,845,580 A | 7/1989 | Kitchens | |
| 4,907,120 A | 3/1990 | Kaczmarek et al. | |
| 5,416,663 A | 5/1995 | Atkins | |
| 6,061,445 A | 5/2000 | Rahamim et al. | |
| 6,198,816 B1 | 3/2001 | Hein et al. | |
| 6,201,865 B1 | 3/2001 | Dupuis et al. | |
| 6,385,235 B1 | 5/2002 | Scott et al. | |
| 6,411,680 B1* | 6/2002 | Rousse | 379/21 |
| 6,418,222 B2* | 7/2002 | Wong et al. | 379/412 |
| 2002/0181696 A1* | 12/2002 | Murakoshi | 379/399.01 |

FOREIGN PATENT DOCUMENTS

WO WO98/48541 10/1998

OTHER PUBLICATIONS

Copending Patent Application, U.S. Appl. No. 10/085,499, filed Feb. 27, 2002, "Multi-Stage Isolation Barrier Circuitry And Method For Connection Of A Telephony Device To A Telephone Line," 27 pgs.
Thompson, "Silicon Laboratories Surges Ahead With Analog Modem Improvements," 2002; 17 pgs.
Silicon Laboratories, Si3034 ; "3.3V Global Direct Access Arrangement," Rev. 2.01; Sep. 2001; 66 pgs.

* cited by examiner

*Primary Examiner*—Jefferey Harold
(74) *Attorney, Agent, or Firm*—O'Keefe, Egan, Peterman & Enders, LLP

(57) ABSTRACT

A surge clamp circuit that may be implemented with DAA circuitry to limit the total voltage developed across one or more line side capacitors due to charge pumping phenomenon during a multi-transient events such as lightning strikes. The surge clamp circuit is capable of electronically sensing a transient event (e.g., lightning strike) and of momentarily turning on one or more components of a DAA hookswitch circuit during on hook mode to discharge the voltage developed across one or more line side capacitors before it reaches critical breakdown levels. The surge clamp circuit may be configured with a clamping sensitivity selected so that the DAA hookswitch circuitry is only activated or turned on upon occurrence of relatively large and potentially damaging transient events, and not upon occurrence of non-damaging transient events, such as operational signals.

45 Claims, 12 Drawing Sheets

| FIG. 3A | FIG. 3B | FIG. 3C |

FIG. 3 - PRIOR ART

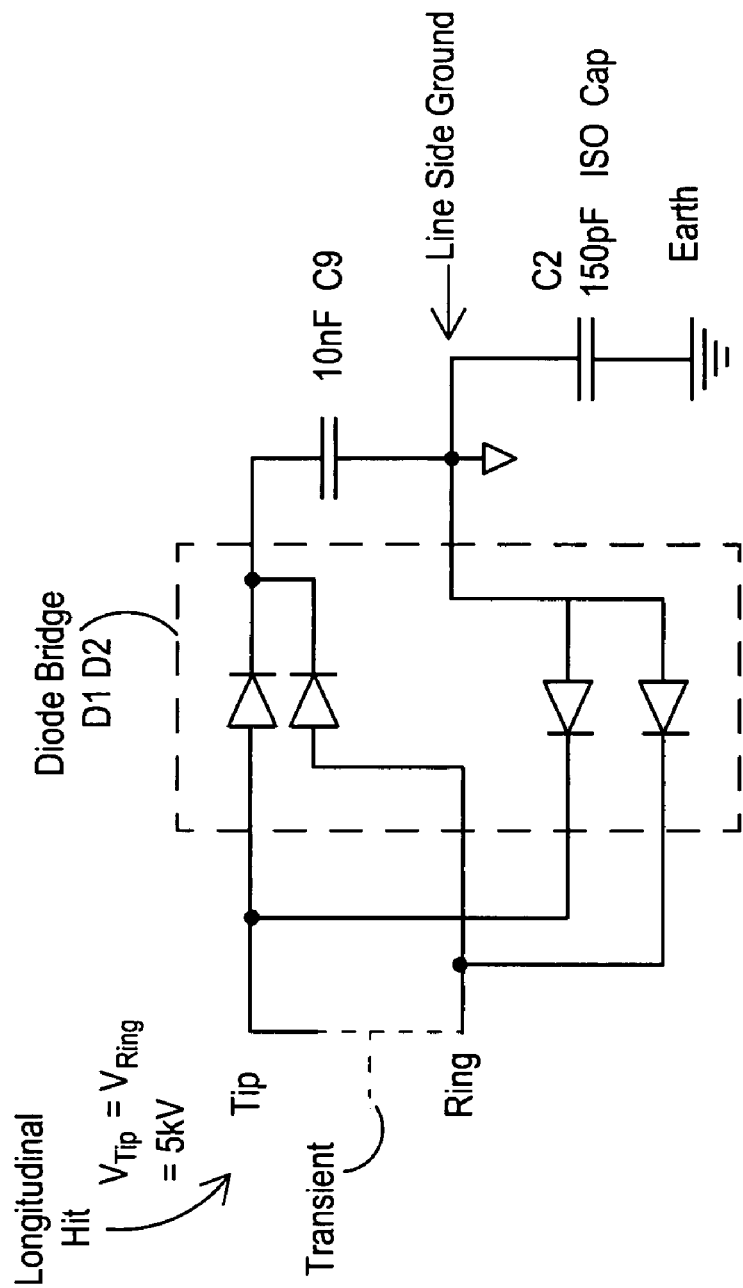
FIG. 4 — PRIOR ART

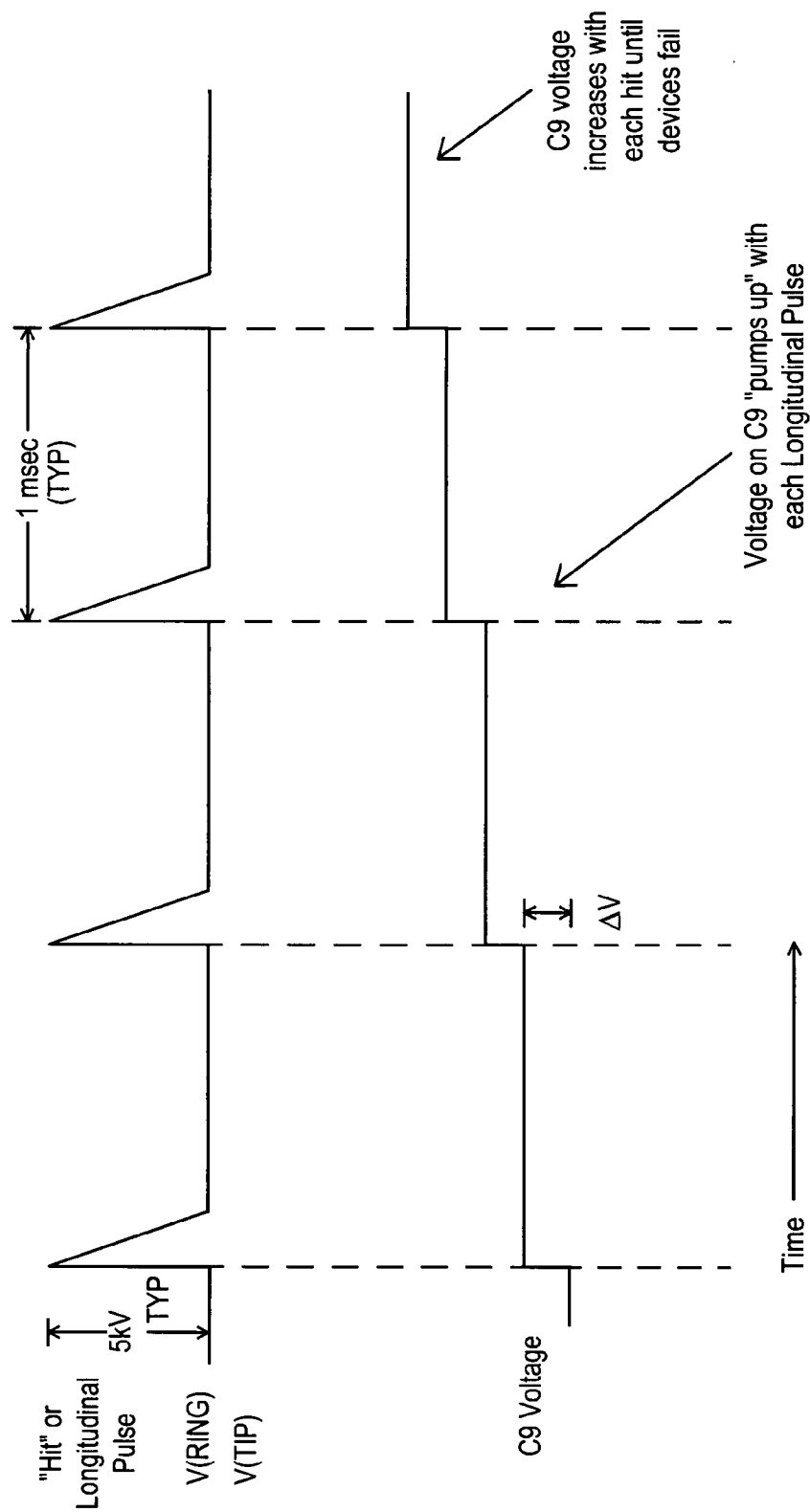
FIG. 5 — TRANSIENT PUMP-UP EVENT

SURGE CLAMP PROTECTION CIRCUIT

TECHNICAL FIELD OF THE INVENTION

This invention relates to the field of isolation systems for use in selectively isolating electrical circuits from one another. More particularly, this invention relates to isolation systems used with digital access arrangement circuitry for connecting to telephone networks.

BACKGROUND

Electrical isolation barriers can be identified in many industrial, medical and communication applications where it is necessary to electrically isolate one section of electronic circuitry from another electronic section. In this context, isolation exists between two sections of electronic circuitry if a large magnitude voltage source (typically on the order of 1000 volts or more) connected between any two circuit nodes separated by the barrier causes less than a minimal amount of current flow (typically on the order of 10 milliamperes or less) through the voltage source. An electrical isolation barrier must exist, for example, in communication circuitry that connects directly to the standard two-wire public switched telephone network and that is powered through a standard residential wall outlet.

The Federal Communications Commission (FCC) has determined that residential telecommunications equipment (e.g., solid-state modems) should have surge protection up to a threshold voltage level (e.g., 1500 volts). In particular, the FCC regulations, Part 68, which governs electrical connections to the telephone network in order to prevent network harm, provides that an isolation barrier capable of withstanding 1000 volts rms (root mean square) at 60 Hz with no more than 10 milliamps current flow, must exist between circuitry directly connected to the two wire telephone network and circuitry directly connected to the residential wall outlet.

In order to achieve regulatory compliance, a conventional approach to electrical isolation is to ensure that there is enough spacing between the telephone network circuits and other circuits referenced to protective earth ground. The components permitted for use across this isolation barrier are limited to transformers, high voltage capacitors, optoisolators, relays and large resistors. However, it has been determined that in actual field usage, higher surge voltages (e.g. 3,000 to 5,000 volts) may occur across this isolation barrier. When such voltages are present, air may begin to ionize anywhere within the enclosed system; dielectric breakdown may occur within the isolation barrier components, including high voltage capacitors. In short, the damage to the system is undeterministic and may require the replacement of the entire system.

Direct Access Arrangement (DAA) circuitry may be used to terminate the telephone connections at a phone line user's end to provide a communication path for signals to and from the phone lines. DAA circuitry includes the necessary circuitry to terminate the telephone connections at the user's end and may include, for example, an isolation barrier, DC termination circuitry, AC termination circuitry, ring detection circuitry, and processing circuitry that provides a communication path for signals to and from the phone lines. It is also desirable that the DAA circuitry act as an isolation barrier to meet the requirements of FCC regulations, Part 68. Examples of DAA circuitry known in the art may be found described in U.S. Pat. No. 6,385,235 and in U.S. patent application Ser. No. 09/347,688 filed Jan. 2, 1999 and entitled "DIGITAL ACCESS ARRANGEMENT CIRCUITRY AND METHOD HAVING A SYNTHESIZED RINGER IMPEDANCE FOR CONNECTING TO PHONE LINES" by Tuttle et al., the disclosure of each being incorporated herein by reference.

In telecommunications equipment that utilize DAA circuitry, such as for example modem circuits, a high voltage surge can come from one of two sources: the telephone line or the power line. One of the most common causes of high voltage surges is a lightning strike, although telephone central office equipment and power equipment failures can also cause similar surges. Once a surge is introduced into a modem circuit, it can be classified into one of two types: metallic (differential) or longitudinal (common mode). Longitudinal surges occur between the wires in the transmission system and the system ground (often the physical earth). For a typical consumer phone line system the two wires are labeled tip and ring. Most surges caused by lightning striking the ground are longitudinal in nature. These surges cause tip and ring to rise, either positively or negatively, in voltage relative to earth. This stresses electronic components which bridge the isolation barrier, such as transformers, relays, opto-isolators, and capacitors. A metallic surge, which occurs between the two wires of a transmission system, is usually the result of a longitudinal event. In a typical telephone loop, the impedance from tip to earth is usually not identical to the impedance from ring to earth. This difference in impedances during a longitudinal surge yields a voltage from tip to ring. This stresses electronic components that connect across tip and ring High voltage surges may also occur as multiple surge events, often caused by multiple lightning strikes. Contrary to popular belief that a lightning strike is a single bolt of lightning, a lightning strike is actually composed of a series of multiple strokes. The average number of strokes within a single lightning strike has been estimated to be about four. The duration of each lightning stroke varies, but has been estimated to average about 30 microseconds. The average peak power per stroke has been estimated to be about $10^{12}$ watts. Because these strokes are spaced close together in time (the median time between strokes has been estimated to be 60 ms), they can have what has been termed a "pump-up" effect on capacitive portions of a modem circuit. In this regard, a lightning strike can occur that has individual strokes with insufficient power to damage any components on a modem board. However, if a capacitive node is exposed to the surge, that node will temporarily store energy from each individual stroke. The amount of time it takes for this charge to dissipate is determined by the time constant of the specific capacitive circuit. If the lightning strike consists of multiple strokes, and if the multiple strokes are spaced close enough together such that charge placed on the capacitive node has insufficient time to dissipate, each stroke will result in energy being stored in the capacitor. If the cumulative amount of energy stored produces a voltage across the capacitor that causes the capacitor to break down, then damage to some part of the modem circuit (either the capacitor itself or the components nearby) can occur. This "pump-up" effect of capacitive nodes is challenging to reproduce in laboratory situations, but has been shown through laboratory simulations and experiments, as well as field study, to be a factor in DAA and modem damage.

SUMMARY OF THE INVENTION

Disclosed herein is a surge clamp circuit that may be implemented with other parts of a DAA circuit to limit the total voltage developed across a line side capacitor due to charge pumping phenomenon occurring during longitudinal surge events (e.g., during a lightning strike or multiple high voltage longitudinal surges of other types that may be caused by telephone central office equipment failures, power equipment failures, etc.). As so employed, the disclosed surge clamp circuit may be employed to avoid build-up of damaging voltages and the resulting breakdown of surrounding components due to subsequent large current flows that may result due to charge pumping. Advantageously, the disclosed surge clamp circuit may make use of existing DAA hookswitch circuitry to clamp excessive voltages that result from charge pumping, without the expense and space requirements of conventional solutions to the charge pumping problem, e.g., varistor clamp devices.

In operation, the disclosed surge clamp circuit is capable of electronically sensing a transient event (e.g., lightning strike) and of momentarily turning on one or more components of a DAA hookswitch circuit during on hook mode to discharge the voltage developed across a line side capacitor before it reaches critical breakdown levels. In one embodiment, one or more components of the disclosed surge clamp circuitry may be selected to achieve a desired clamping sensitivity so that DAA hookswitch circuitry is only activated or turned on by the surge clamp circuit upon occurrence of transient events that produce a threshold value of current to ground. By doing so, the disclosed surge clamp circuit may be configured to only activate or turn on hookswitch circuitry and clamp voltage upon occurrence of relatively large and potentially damaging multi-transient events, and not upon occurrence of non-damaging events such as operational signals like billing tones that may occur during on hook mode.

In one respect, disclosed herein is a communication system, including: phone line side circuitry that may be coupled to a telephone network, the phone line circuitry including hookswitch circuitry and at least one capacitor; and surge clamp circuitry within the phone line side circuitry, the surge clamp circuitry being configured to activate one or more components of the hookswitch circuitry upon occurrence of a longitudinal surge event to discharge any voltage present across the at least one capacitor.

In another respect, disclosed herein is a method of operating a communication system that may be coupled to a telephone network, including: providing phone line side circuitry, the phone line circuitry including hookswitch circuitry and at least one capacitor; and activating one or more components of the hookswitch circuitry upon occurrence of a longitudinal surge event to discharge any voltage present across the at least one capacitor.

In another respect, disclosed herein is a surge clamp circuit within phone line side circuitry of a communication system that may be connected to a telephone network, the surge clamp circuit including: a first surge clamp node configured to be coupled between a first node of the phone line circuitry and ground, the first node of the phone line circuitry being a first plate of at least one capacitor of the phone line circuitry; a second surge clamp node coupled to the first surge clamp node and configured to be coupled to a second node of the phone line circuitry, the second node of the phone line circuitry being configured to activate a hookswitch circuit of the phone line circuitry to discharge any voltage present across the first plate and a second plate of the at least one capacitor upon the application of current from the second node of the surge clamp circuit to the first node of the phone line circuitry; and wherein the second node of the surge clamp circuit is configured to apply current to the second node of the phone line circuitry upon occurrence of a longitudinal surge event between the first node of the phone line circuitry and the ground.

In another respect, disclosed herein is a communication system, including: phone line circuitry that may be coupled to a telephone network, the phone line circuitry including hook-switch circuitry; and surge detection and hookswitch activation circuitry within the phone line circuitry; wherein the surge detection and hookswitch activation circuitry is configured to detect the occurrence of a longitudinal surge event above a threshold current value and to activate one or more components of the hook-switch circuitry upon detection of the occurrence of the longitudinal surge event above the threshold current value.

In another respect, disclosed herein is a method of operating hookswitch circuitry within phone line circuitry that may be coupled to a telephone network, including: detecting the occurrence of a longitudinal surge event above a threshold current value; and activating one or more components of the hook-switch circuitry within the phone line circuitry upon detection of the occurrence of the longitudinal surge event above the threshold current value.

DESCRIPTION OF THE DRAWINGS

So that the manner in which the herein described advantages and features of the present invention, as well as others which will become apparent, are attained and can be understood in detail, a more particular description of the invention summarized above may be had by reference to the embodiments thereof which are illustrated in the appended drawings, which drawings form a part of this specification.

It is noted, however, that the appended drawings illustrate only exemplary embodiments of the invention and are therefore not to be considered limiting of its scope, for the invention may admit to other equally effective embodiments.

FIG. 4 is a simplified circuit diagram representing prior art digital DAA circuitry responsible for charge pumping action.

FIG. 5 illustrates voltage waveform behavior for the prior art circuit of FIG. 4 showing charge pumping action during a multi-transient longitudinal event.

DESCRIPTION OF ILLUSTRATIVE EMBODIMENTS

Figure 1:
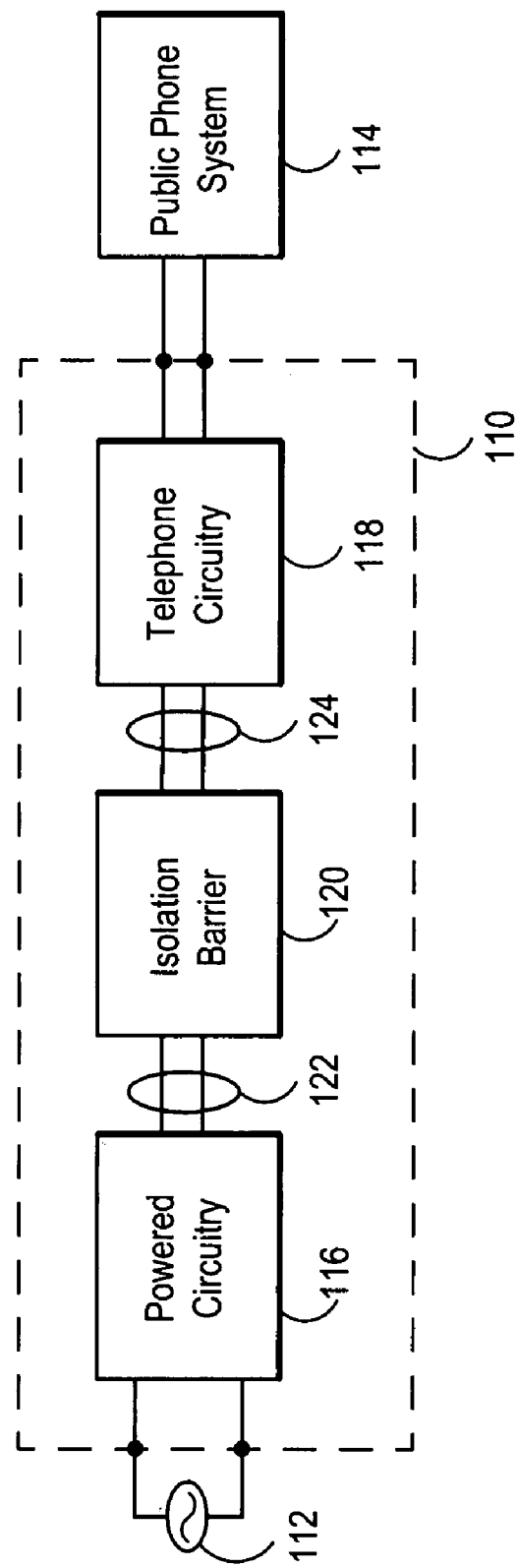
FIG. 1 is a block diagram of a telephone line connection circuitry according to one embodiment of the disclosed systems and methods.

In order to provide a context for understanding this description, FIG. 1 illustrates a typical application for the present invention: circuitry that includes circuitry powered by a source external to the phone system. A basic telephone line side circuit 118 is connected to the public telephone system and does not have a separate power connection. DAA circuitry 110 for coupling to a phone line may be used with or incorporated within devices including, but not limited to, radio (cordless), modem, speakerphone, and answering machine devices that may require an external source of power 112, typically obtained by plugging the phone (or a power supply transformer/rectifier) into a typical 110-volt residential wall outlet. In order to protect public phone system 114 (and to comply with governmental regulations), it is necessary to isolate "powered circuitry" 116 that is externally powered from "isolated circuitry" 118 (isolated circuitry may also be called telephone line side circuit) that is connected to the phone lines, to prevent dangerous or destructive voltage or current levels from entering the phone system (similar considerations exist in many other applications as well, including communication, medical and instrumentation applications in which this invention may be beneficially applied). The required isolation is provided by isolation barrier 120. The signal that passes through the isolation barrier 120 may be a digital or analog signal. In some applications, communication across isolation barrier 120 may be unidirectional (in either direction), but in many applications, including telephony, bidirectional communication is required. Bidirectional communication may be provided using a pair of unidirectional isolator channels, or by forming a single isolation channel and multiplexing bidirectional signals through the channel. The primary requirements placed on isolation barrier 120 are that it effectively prevents harmful levels of electrical power from passing across it, while accurately passing the desired signal from the powered side 122 to the isolated side 124, or in the reverse direction if desired.

Figure 2:
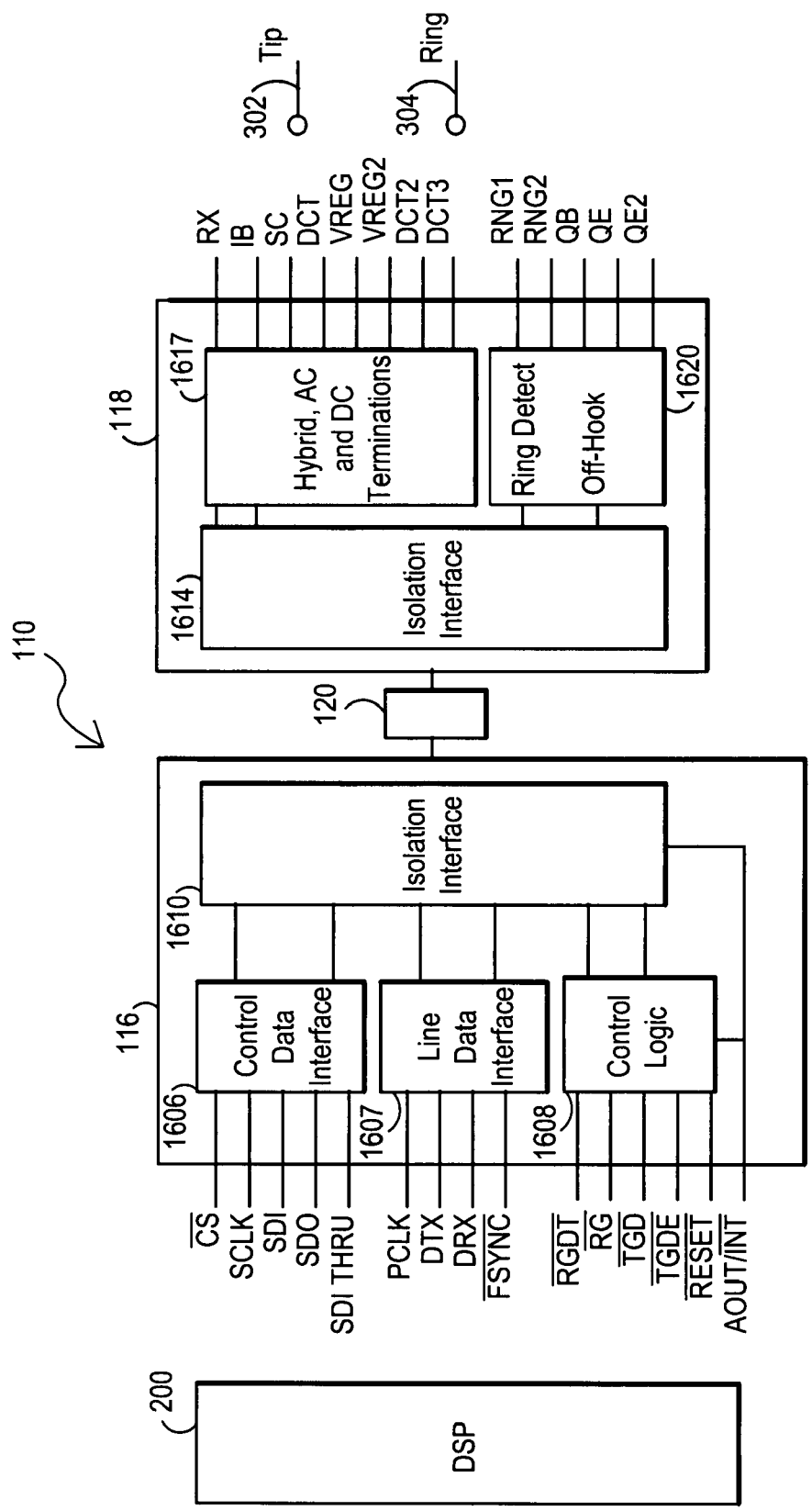
FIG. 2 is a general block diagram of digital DAA circuitry including phone line side circuitry, an isolation barrier, and powered side circuitry according to one embodiment of the disclosed systems and methods.

FIG. 2 is a general block diagram of digital DAA circuitry 110 including telephone line side circuit 118, an isolation barrier 120, and powered side circuitry 116 according to the present invention. The isolation barrier 120 may include any device or combination of devices suitable for providing the required isolation, and also allowing for the transmission of digital information between the isolation interface 1614 in the phone line side circuitry and the isolation interface 1610 in the powered side circuitry. In this regard, isolation barrier 120 may include, for example, one or more capacitors, one or more transformers, opto-isolators, combinations thereof, etc. The telephone line side circuit 118 may be connected to phone lines of a telephone network system (e.g., public telephone system, PBX network, etc.), and the powered side circuitry 116 may be connected to external controllers (e.g., including, but not limited to, digital signal processor (DSP) 200) that may be part of a communication device, such as a phone or modem. Further exemplary details on coupling powered side circuitry to a DSP may be found illustrated and described in relation to the exemplary embodiment of FIG. 7.

The powered side circuitry 116, which may be implemented as an integrated circuit (IC), may communicate with the external controller through a control data interface 1606, a line data interface 1607 and control logic 1608. In addition, the control data interface 1606, line data interface 1607 and the control logic 1608 are connected to the isolation interface 1610 so that control, status, signal and other desired information may be transmitted to and received from the telephone line side circuit 118 across the isolation barrier 120.

In the embodiment depicted, the control data interface 1606 and line data interface 1607 may have a number of external pins providing a serial port interface to the external controller, such as serial port data input pin (SDI) for providing serial port control data input, serial port data output pin (SDO) for providing serial port control data output, serial port bit clock input pin (SCLK) for controlling the serial data on SDO and for latching the data on SDI, chip select input pin (CS_bar) (it is noted that the suffix "_bar" is used to denote a signal that is typically asserted when at a low logic level) for providing an active low input control signal that enables the SPI Serial port (when inactive, SCLK and SDI are ignored and SDO is high impedance), SDI passthrough output pin (SDITHRU) for providing cascaded SDI output signal to daisy-chain the SPI interface with additional devices, master clock input pin (PCLK) for providing a master clock input, transmit PCM or GCI highway data output pin (DTX) for outputting data from either the PCM or GCI highway bus, receive PCM or GCI highway data input pin (DRX) for receiving data from either the PCM or GCI highway bus, and frame sync input pin (FSYNC_bar) for providing a data framing signal that is used to indicate the start and stop of a communication/data frame.

Similarly, the control logic 1608 may have a number of external pins providing control and status information to and from the external controller, such as ring detect output pin (RGDT_bar) for producing an active low rectified version of the ring signal, ring ground output pin (RG_bar) for providing a control signal for ring ground relay, (may be used to support ground start applications), TIP ground detect input pin (TGD_bar) for detecting current flowing in TIP for supporting ground start applications, TIP ground detect enable output pin (TGDE_bar) for providing a control signal for the ground detect relay (may be used to support ground start applications), reset input pin (RESET_bar) for providing an active low input that may be used to reset all control registers to a defined initialized state (may also be used to bring powered side circuitry 116 out of sleep mode), and analog speaker output/interrupt output pin (AOUT/INT) for providing an analog output signal for driving a call progress speaker in AOUT mode (alternatively may be set to provide a hardware interrupt signal).

The telephone line side circuit 118, which may be implemented as an integrated circuit (IC), may communicate with the phone lines through hybrid, AC and DC termination circuitry 1617 (the DC termination circuitry also provides an internal power supply voltage), and determine ring-detect and off-hook status information through off-hook/ring-detect block 1620. In addition, the hybrid, AC and DC termination circuitry 1617 and the off-hook/ring-detect block 1620 are connected to the isolation interface 1614 so that control, status, signal and other desired information may be transmitted to and received from the powered side circuitry 116 across the isolation barrier 120.

In the embodiment depicted, the hybrid portion of hybrid, AC and DC termination circuitry 1617 has a receive input pin (RX) for providing the receive side input from the telephone network, an internal bias pin (IB) for providing a bias voltage to the device, a SC Connection pin (SC) for sensing a surge event and activating a clamp, DC termination pins (DCT, DCT2 and DCT3) for providing DC termination to the telephone network, a voltage regulator pin (VREG) for connecting to an external capacitor to provide bypassing for an internal power supply, and a voltage regulator 2 pin (VREG2) for connecting to an external resistor to provide bypassing for an internal power supply.

The off-hook/ring-detect block 1620 may have external input pins allowing status information to be provided concerning phone line status information (RNG1, RNG2), such as ring and caller identification signals. For example, the first ring detect pin (RNG1) may connect to the tip (T) lead 302 of the phone line through a resistor, and the second ring detect pin (RNG2) may connect to the ring (R) lead 304 of the phone line through a resistor. Further exemplary details on coupling a telephone line circuit to tip and ring leads of a phone line may be found illustrated and described in relation to the exemplary embodiment of FIG. 7. In addition, off-hook/ring-detect block 1620 may have external transistor emitter output pins (QE, QE2) and transistor base pin (QB) that control external off-hook circuitry to enter, for example, an off-hook state or a limited power mode to get caller identification information. More particularly, the transistor emitter output pins (QE, QE2) may be connected to respective emitters of bipolar transistors within external hook-switch circuitry, and the transistor base output pin (QB) may be connected to a base of a bipolar transistor within external hook-switch circuitry.

Figure 3A:
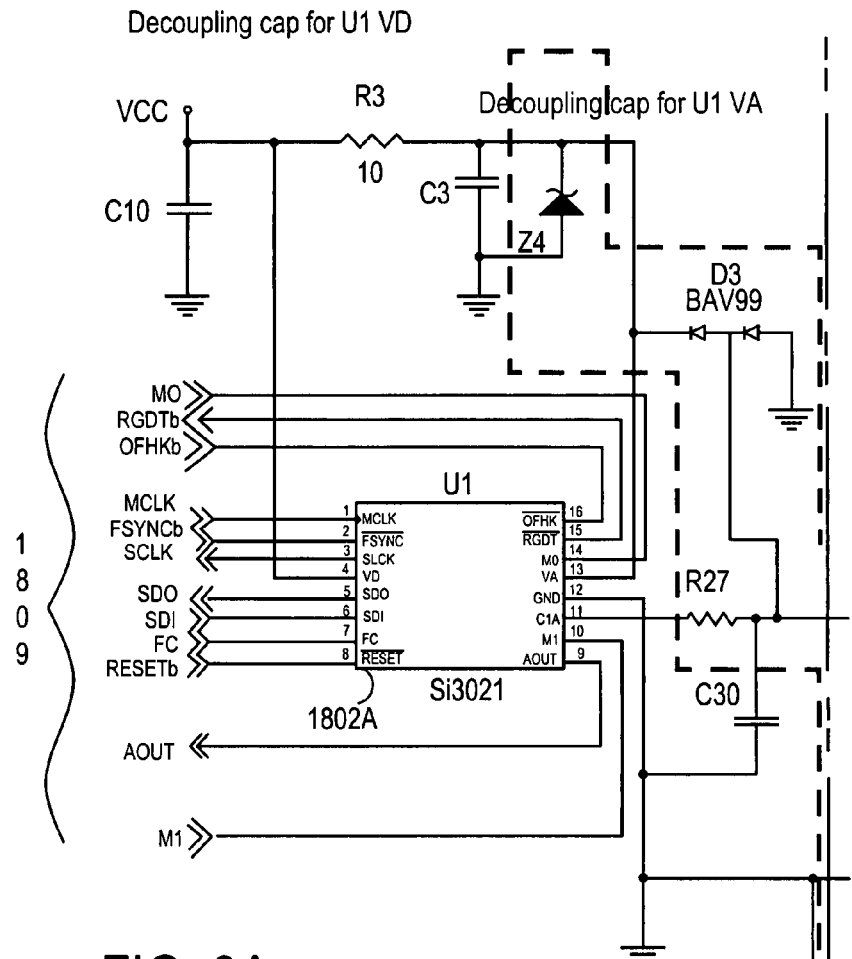
FIG. 3 is a general circuit diagram of prior art digital DAA circuitry implemented with two integrated circuits (ICs), a capacitive isolation barrier, and external circuitry.
Figure 3B:
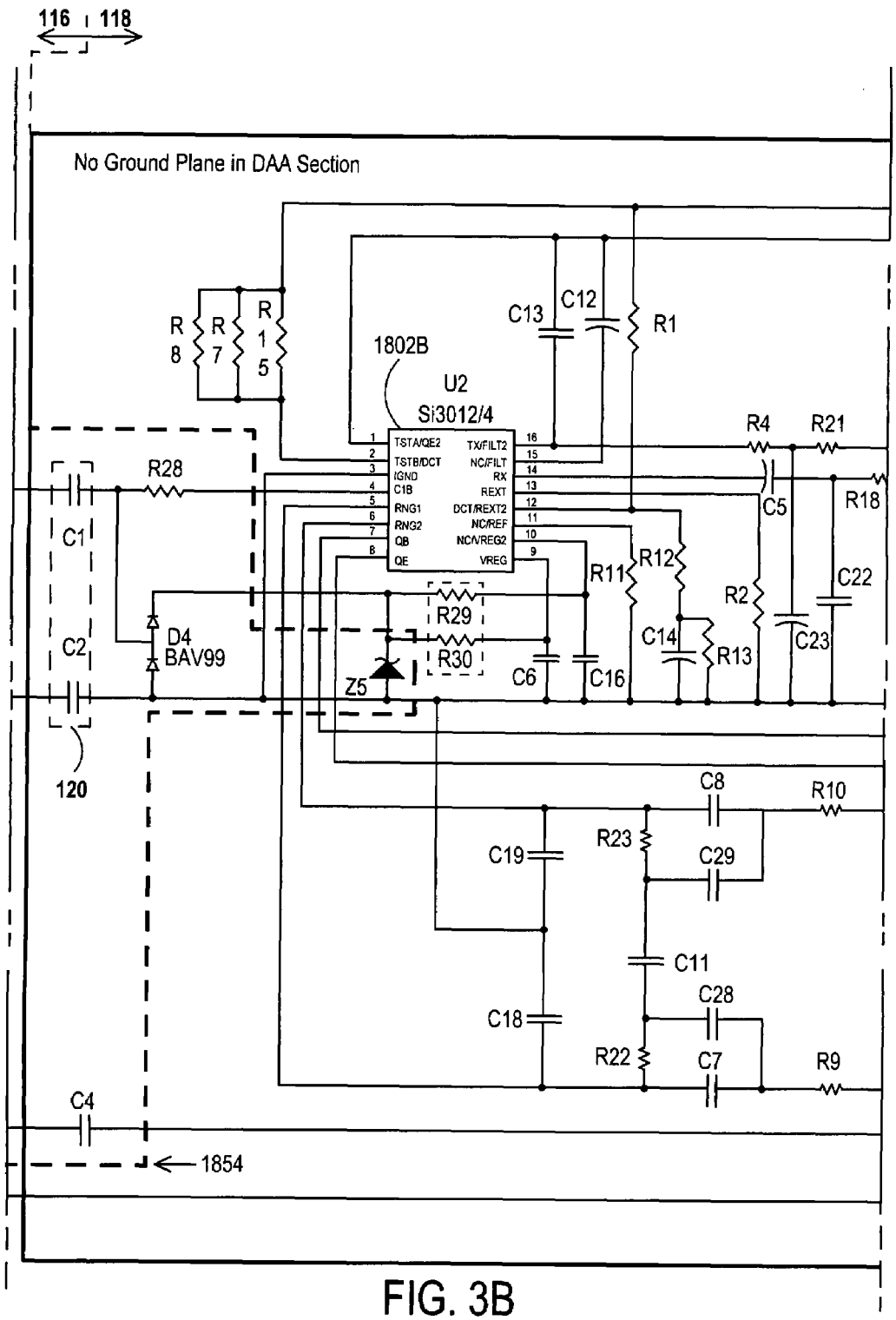
Figure 3C:
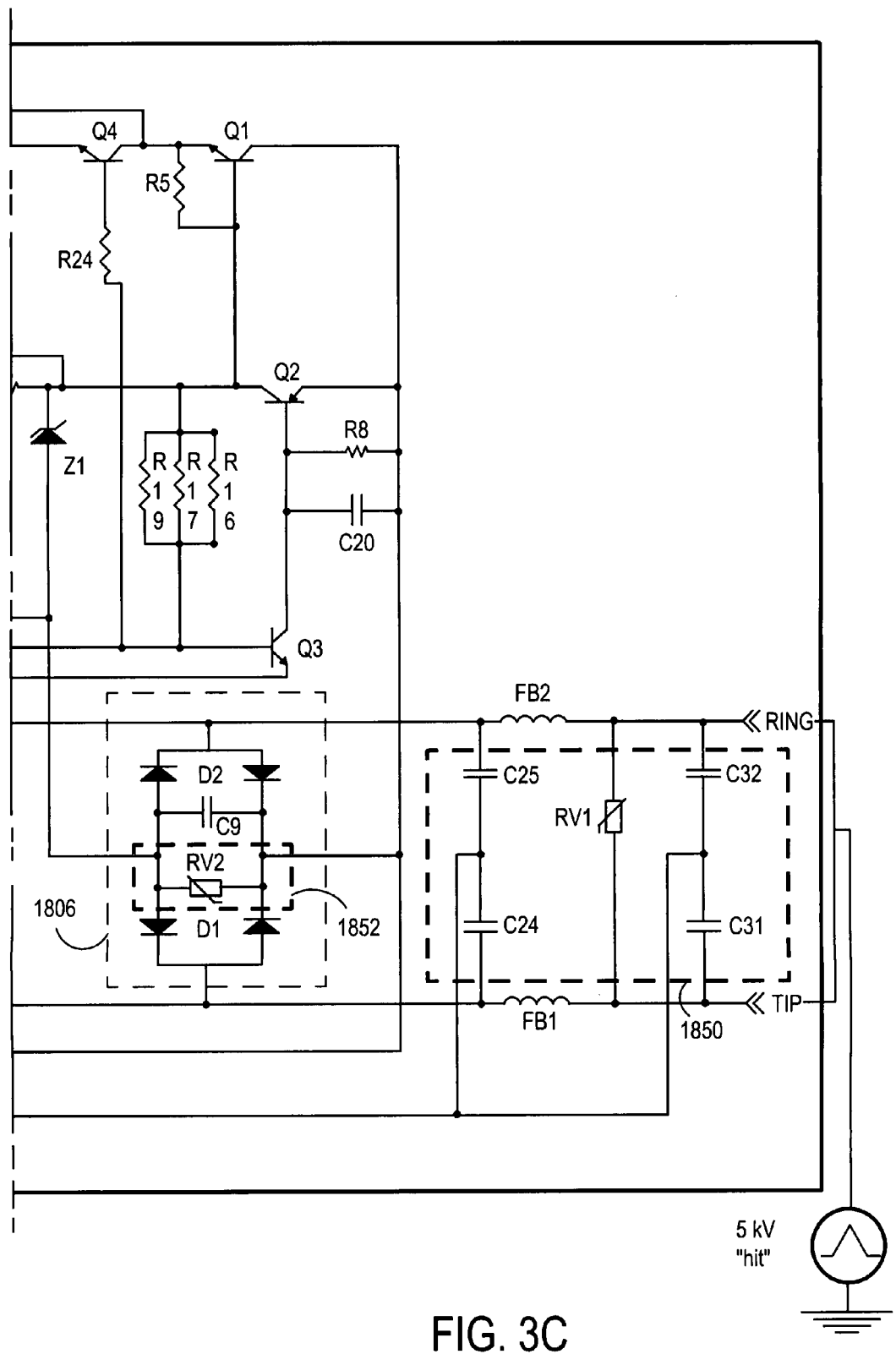

FIG. 3 is a general circuit diagram illustrating an example of prior art digital DAA circuitry 110 implemented with two integrated circuits (ICs) and a capacitive isolation barrier 120. The DAA circuitry 110 may be coupled to phone line TIP and RING lines as shown. In particular, powered side circuitry 116 may include a powered side integrated circuit (IC) 1802A, and telephone line side circuit 118 may include a phone line side IC 1802B. External discrete devices may be coupled to the TIP line, RING line, phone line side IC 1802B and powered side IC 1802A. The external circuitry may include circuitry, such as hookswitch circuitry and diode bridge circuitry 1806. Hookswitch circuitry switches between on-hook and off-hook modes depending upon the desired condition of the DAA circuitry. During an off-hook condition the hook switch circuitry may be placed in saturation and act as a closed switch that "seizes" or "collapses" the phone line, i.e., draws available phone line current. Exemplary components of hookswitch circuitry shown in FIG. 3 may be switch transistors Q1 and Q2, which are controlled by switch transistor Q3.

In the prior art DAA circuitry depicted in FIG. 3, external pins 1809 of the powered side IC 1802A are connected to an external digital signal processor (DSP) and to a external application specific IC (ASIC) or controller. It will be recognized that alternatively powered side integrated circuit 1802A may be formed within another circuit such as a DSP integrated circuit. The isolation barrier 120 includes a first capacitor (C1) connecting an external signal (C1A) pin on the powered side IC 1802A to an external signal (C1B) pin on the phone line side IC 1802B. In addition, the isolation barrier 120 has a second capacitor (C2) connecting the isolated ground (IGND) pin on the phone line side IC 1802B to the system ground (GND) pin on the powered side IC 1802A. In addition, the isolated ground (IGND) pin may be connected to a node within diode circuitry 1806 (and thereby be connected to the phone line).

As previously described, telephone DAA circuits are designed to withstand and survive abnormal transient conditions. As illustrated in FIG. 3, protection circuits are included in prior art DAA circuitry 110 that act to limit the peak voltage across certain circuit components that would otherwise fail during transient conditions if not protected. In particular, bipolar transistors Q1, Q2, Q3, and Q4 are protected from multi-transient events by varistor RV2 as explained further below. Lightning strikes are the primary cause of such transient events but may be caused by other fault conditions as well.

As shown in FIG. 3, the circuitry relating to surge immunity in example prior art DAA circuitry 110 may be divided into three sections, 1850, 1852 and 1854. Each section uses components to achieve specific functions that, when aggregated, produce a DAA circuit designed to survive adverse surge conditions.

Still referring to FIG. 3, section 1850 consists of several high voltage capacitors (C24, C25, C31 and C32) and a sidactor (RV1) placed at tip and ring. Section 1850 often takes the brunt of surges emanating from the telephone line. Sidactor RV1 is placed between tip and ring to guard against metallic surges (large voltage differentials between tip and ring). Sidactor RV 1 reacts quickly to a high voltage occurring between tip and ring, and operates by crowbarring the voltage across itself to near zero volts once it is triggered. This helps ensure metallic voltages beyond 300-350V are not exceeded and are not present for long periods of time in the circuit. This protects the components in the circuit such as transistors Q1 and Q2, which form the hookswitch of the DAA. In this example, sidactor RV1 is rated at 270V in order to avoid interference with large voltage ring signals that could be seen by modems located close to the central office ("CO").

In prior art DAA circuit 110 of FIG. 3, high voltage capacitors (C24, C25, C31 and C32) on tip and ring may be used to lower electromagnetic emissions and increase electromagnetic immunity. Since these capacitors exist directly on tip and ring, they are typically designed to be able to withstand the extremely high voltages produced by a surge, e.g., at least 3000V capacitors may be used to ensure robust field performance worldwide. Lower voltage capacitors used on tip and ring increase the risk of damage by a real world surge event. Y2 rated safety capacitors may also be used to bridge the modem isolation barrier. Thru-hole Y2 rated capacitors (which are tested to withstand 5000V surges) are typically inexpensive, and surface mount Y2 capacitors are becoming more cost effective. By using Y2 rated capacitors in DAA circuit 110, extremely high levels of surge immunity (greater than 5000V) may be achieved.

Section 1854 includes a number of components located between the two DAA silicon integrated circuits 1802A and 1802B. In this regard, a single connection between the system-side and telephone line-side integrated circuits 1802A and 1802B exists that is capable of transferring clock, control and data information as well as power to the line-side integrated circuit 1802B. Integrated circuits 1802A and 1802B are shown isolated from each other by high voltage capacitor (C1). Another high voltage capacitor (C4) is used to isolate the separate grounds of the two devices. It will be understood that capacitor C2 is not required, and may be omitted such that pin connection IGND connects to system ground through capacitors C9 and C4. Capacitors C1, C2 and C4 may be referred to as barrier capacitors, and may each have values of 150 pF selected to allow power to be transferred across the capacitive barrier to allow features (such as on-hook line monitoring) that do not require power from the telephone line to be implemented.

Still referring to section 1854 of FIG. 3, if a surge is introduced into the modem (either from the telephone or power line) with a high voltage and a fast rise time (or dv/dt), this dv/dt is multiplied by the barrier capacitance value to produce a current. As the dv/dt increases, the current that is produced also increases. If the surge dv/dt is large enough, thus producing extremely high levels of current, it may be damaging to either of the two silicon DAA integrated circuits 1802A and/or 1802B. To help prevent such damage, section 1854 includes components that act to divert current produced by a very fast high voltage surge away from the integrated circuits and into the power and ground planes. As illustrated in FIG. 3, section 1854 includes two BAV99 diodes D3 and D4 that provide diode links to both power and ground on each side of isolation barrier 120. In this embodiment, when the voltage on the link either exceeds the power supply or drops below ground by more than a diode drop, the appropriate diode forward conducts, providing a path for current to flow away from the link pins on the two DAA integrated circuits. Small value resistors are used on each link pin to ensure that the current is diverted away from the integrated circuits and into the low-resistive paths created by the forward biased diodes.

In addition to BAV99 diodes D3 and D4, two 5.6V zener diodes Z4 and Z5 are used on each side of the barrier to prevent the power supply nodes from reaching dangerously high voltages. Diodes Z4 and Z5 may serve as a type of "escape hatch" for current to flow through during a surge event. If BAV99 diodes D3 and D4 connected to the power supplies described above forward conduct due to a high voltage surge, the large influx of current may cause the power supply nodes on the integrated circuits to increase to dangerously high voltages. Zener diodes Z4 and Z5 clamp the power supply nodes to a specific maximum voltage and funnel any excess current to ground. This operation, in tandem with the BAV99 diodes D3 and D4 described above, provides substantial immunity to very fast high voltage surges.

Still referring to section 1854 of example circuitry of FIG. 3, high voltage barrier capacitors C1 and C4 isolate the two parts of the DAA circuit. As described above, barrier capacitors C1 and C4 may be selected to be at least 3000V capacitors, although Y2 rated capacitors may also be employed to further increase surge immunity. If Y2 rated capacitors are selected for use, they may be selected for use for all high voltage rated capacitors in both Sections 1850 and 1854 in order to benefit from their increased surge rating.

In FIG. 3, section 1852 of DAA circuit 110 is shown including a single varistor (RV2), which is placed in parallel with a 250V line side capacitor C9 that is external to phone line side IC 1802B and that is coupled between tip and ring of telephone line side circuit 118 and phone line side IC 1802B. Specifically, external line side capacitor C9 is coupled between diodes of the diode bridge of telephone line side circuit 118 and phone line side IC 1802B. Varistor RV2 serves to protect against multiple longitudinal lightning strikes. As stated previously, the average number of strokes in a single lighting strike is estimated to be about four. Without varistor RV2 in the circuit of FIG. 3, it is possible for the external line side capacitor C9 of FIG. 3 to store charge from each stroke of a multiple-stroke lightning strike due to voltage division, eventually reaching dangerously high voltage levels both for itself and for surrounding components. More specifically, without varistor RV2 multi-transient longitudinal events may cause a "charge pumping" action to occur which causes the voltage across external line side capacitor C9 to increase in a step function for each transient pulse in a multi-transient event.

FIG. 4 is a simplified illustration isolating that part of the circuit in FIG. 3 responsible for charge pumping action in the absence of varistor RV2, including external line side capacitor C9 and barrier capacitor C2 that are coupled between diodes of the diode bridge and ground. As described above, if the charge pumping action continues due to additional longitudinal hits (e.g., during a multiple-stroke lightning event), the voltage across external line side capacitor C9 may exceed the breakdown voltage of transistors Q1, Q2, Q3, and Q4 of FIG. 3, resulting in a large current flow that may cause damage to one or more of these components. In this regard, breakdown voltages of 300 volts are typical for such components. When a multiple stroke lightning strike occurs that is comprised of a series of lightning strokes such a charge pumping action is likely to occur, and to result in breakdown of any or all of transistors Q1, Q2, Q3, and Q4. An example of this charge pumping phenomenon is illustrated in FIG. 5, where for each transient 5 kV pulse, a corresponding $\Delta V$ of 75V may result. After four 5 kV pulses, a resulting Veq of 300V across external line side capacitor C9 may result.

To address the possibility of charge pumping caused by multiple-stroke lightning strikes, prior art circuitry of Section 1852 of FIG. 3 employs varistor RV2 placed in parallel with external line side capacitor C9. Varistor RV2 acts as a clamp device for voltages in excess of about 270V, limiting the total voltage across external line side capacitor C9 after multiple "hits" to about 270 volts or less and thus avoiding the breakdown of surrounding components and subsequent large current flows. Varistors perform adequately in this role since the units of time for multiple lightning strokes are usually in the range of tens of milliseconds and the resultant voltage across external line side capacitor C9 is in the range of tens of volts per strike. Although effective for limiting the total voltage across external line side capacitor C9, varistor RV2 is relatively large in size and adds cost to prior art DAA circuit 110.

Figure 6:
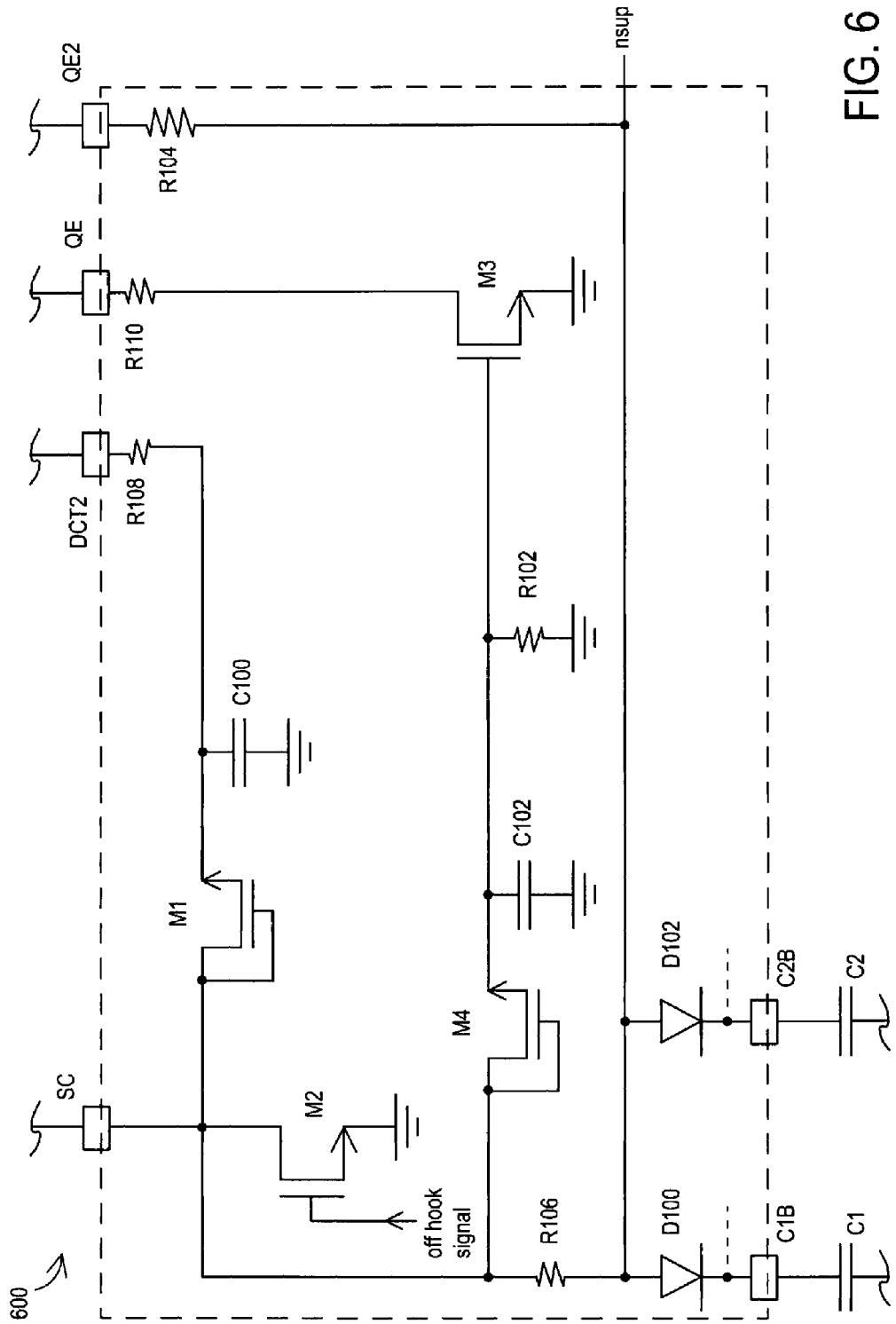
FIG. 6 is a circuit diagram of a surge clamp circuit according to one embodiment of the disclosed systems and methods.
Figure 7A:
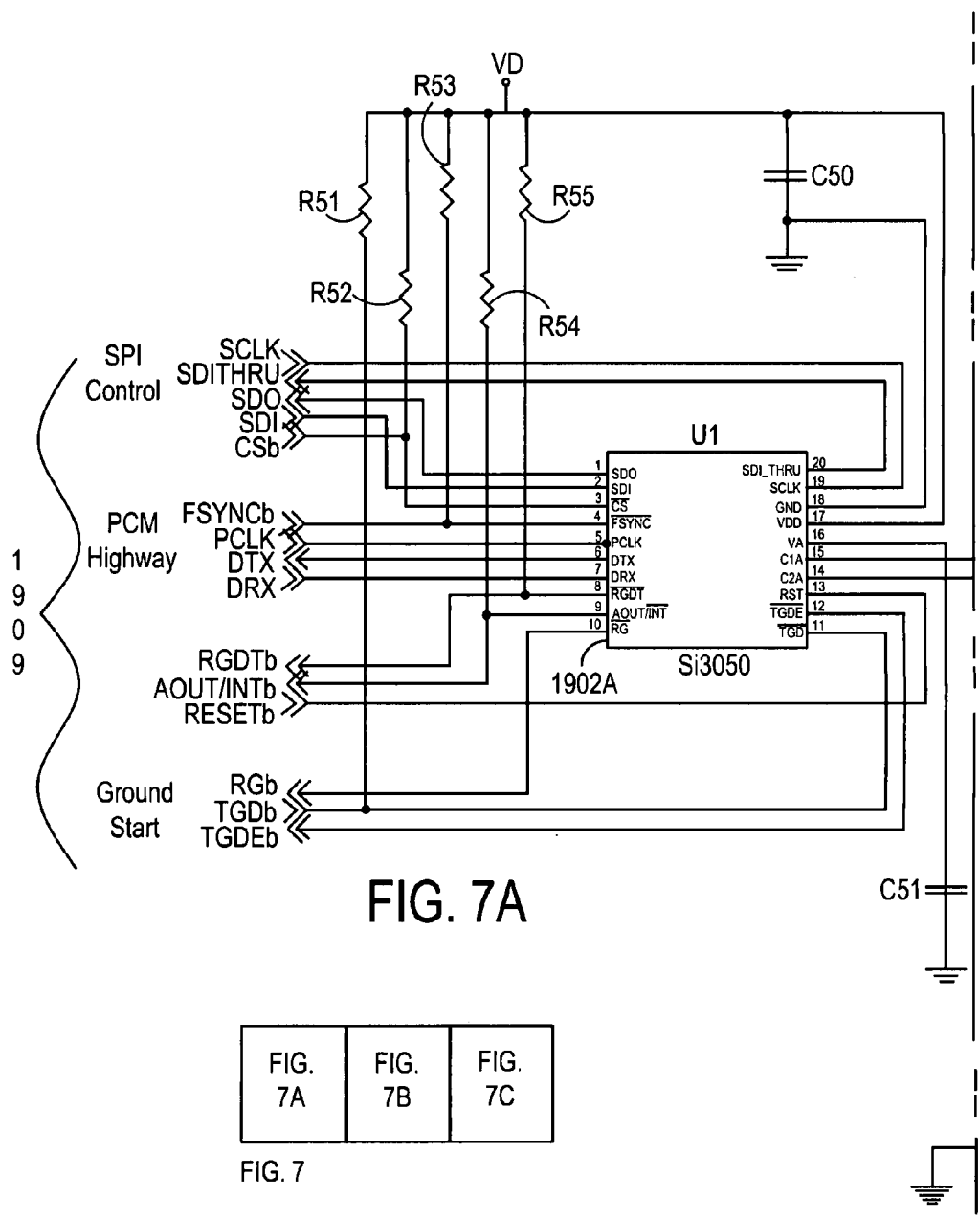
FIG. 7 is a general circuit diagram of digital DAA circuitry implemented with the surge clamp circuit of FIG. 6 according to one embodiment of the disclosed systems and methods.
Figure 7B:
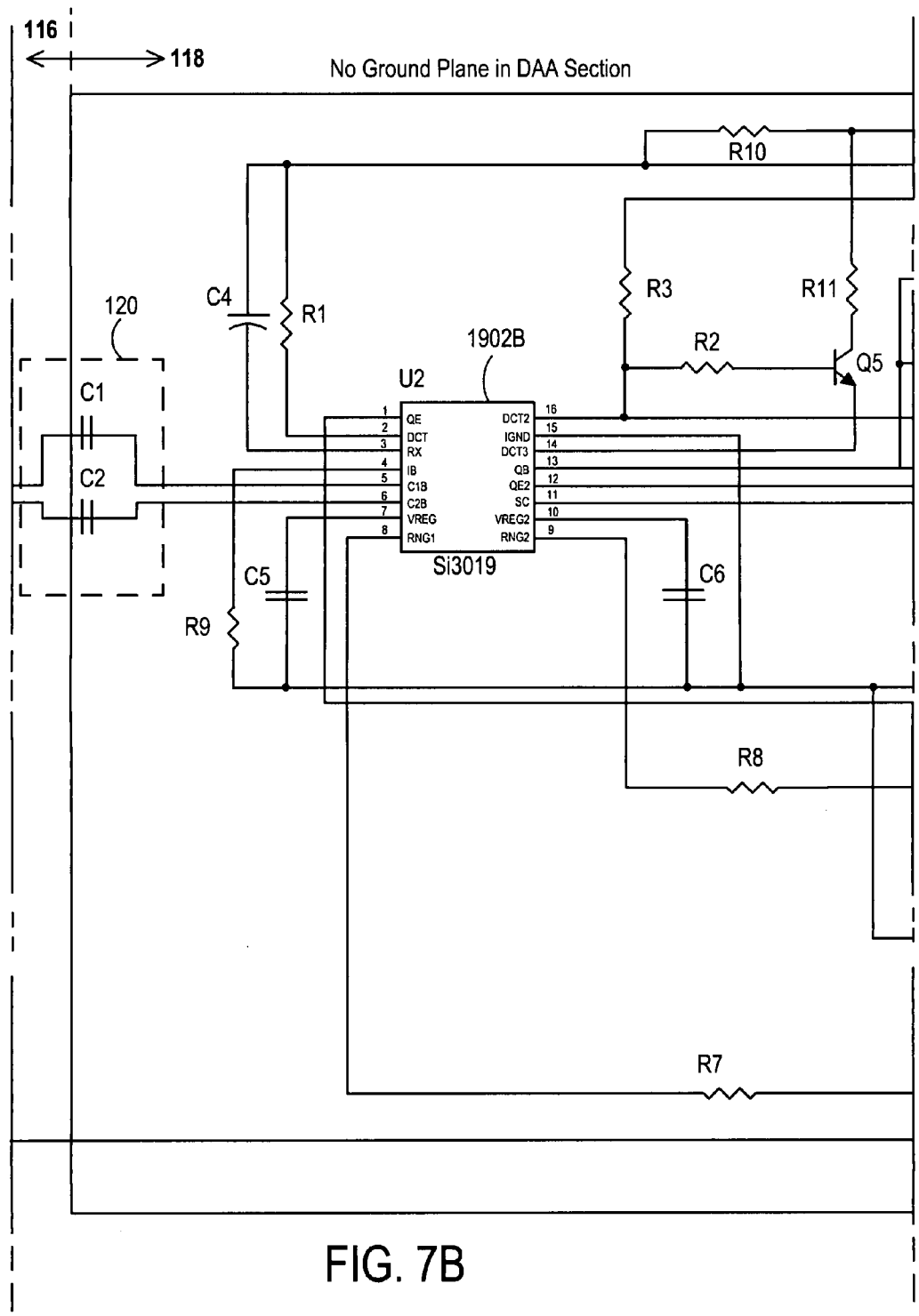
Figure 7C:
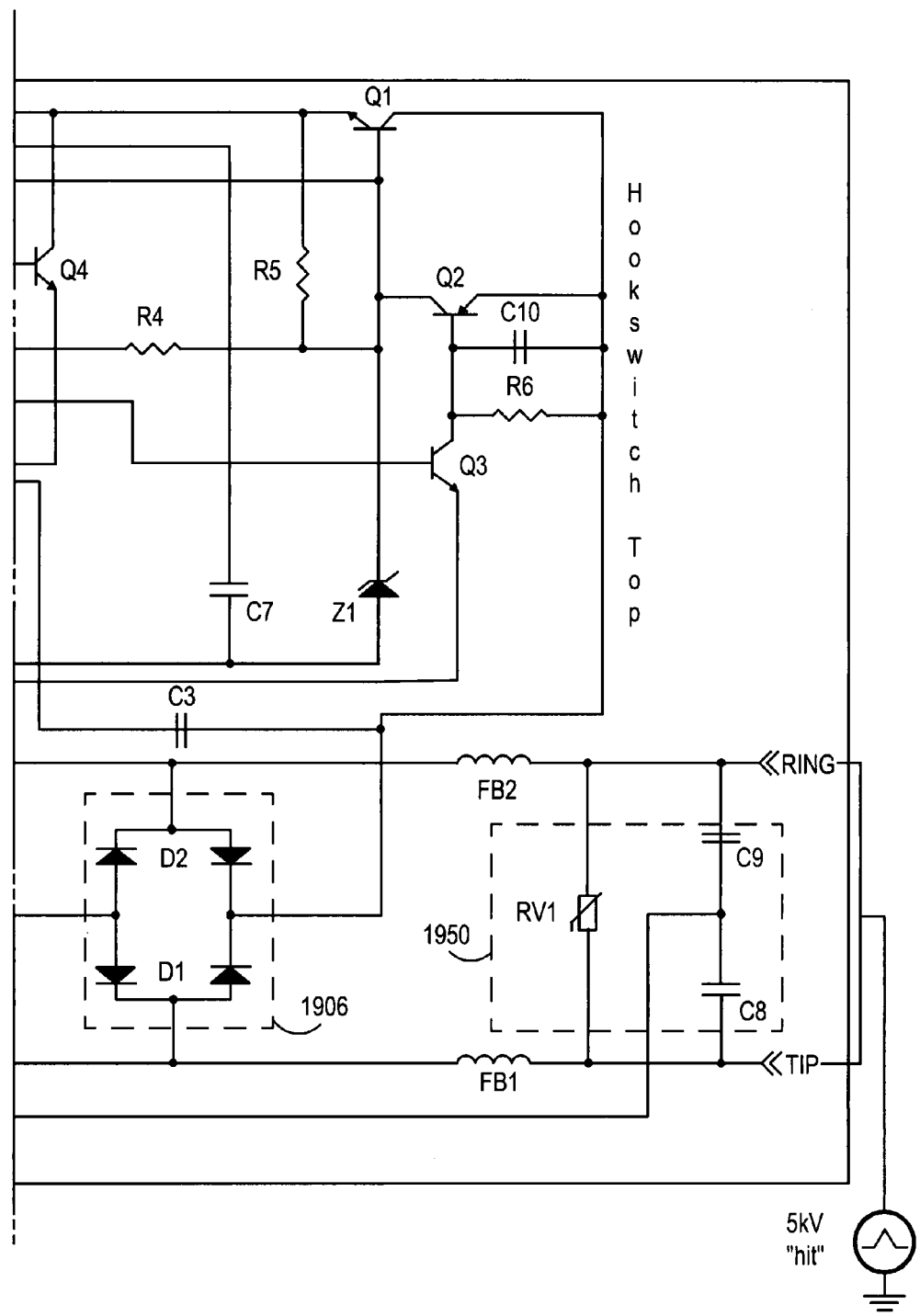

Illustrated in FIG. 6 is surge clamp circuit 600 according to one exemplary embodiment of the disclosed systems and methods that may be implemented with other parts of a DAA circuit as an alternative to a varistor clamp device (such as varistor RV2 of DAA circuitry 110) to limit the total voltage developed across one or more capacitors (such as external line side capacitor C9 of DAA circuitry 110 of FIG. 3 or external line side capacitor C3 of FIG. 7), thus avoiding the breakdown of surrounding components and subsequent large current flows. In operation, surge clamp circuit 600 is capable of electronically sensing a transient event (e.g., lightning strike) and of momentarily turning on transistors of a DAA phone line side circuit (e.g. such as transistors Q1, Q2, Q3, and Q4 of FIG. 3) to discharge the voltage across one or more capacitors (e.g., external line side external line side capacitor C9 of FIG. 3 or external line side capacitor C3 of FIG. 7) before it reaches critical breakdown levels. As so implemented, the disclosed surge clamp circuit 600 may be employed to limit the total voltage across a capacitor/s after multiple high voltage longitudinal surges, e.g., multiple lightning strikes or multiple high voltage longitudinal surges of other types such as caused by telephone central office equipment failures, power equipment failures, etc. Advantageously, embodiments of the disclosed surge clamp circuit may be implemented with less and expense and with lower space requirements than a varistor clamp device such as varistor RV2 of FIG. 3.

FIG. 7 is a general circuit diagram illustrating an example digital DAA circuitry 110 as it may be implemented to include surge clamp circuit 600 according to one embodiment of the disclosed systems and methods. However, it will be understood that the DAA circuitry of FIG. 7 is exemplary only, and that embodiments of the disclosed surge clamp circuitry may be implemented with other DAA circuitry configurations. Examples of such DAA circuitry configurations include, but are not limited to, DAA circuitry 110 of FIG. 3 and DAA circuitry described in U.S. Pat. No. 6,385,235 and in U.S. patent application Ser. No. 09/347,688 filed Jan. 2, 1999 and entitled "DIGITAL ACCESS ARRANGEMENT CIRCUITRY AND METHOD HAVING A SYNTHESIZED RINGER IMPEDANCE FOR CONNECTING TO PHONE LINES" by Tuttle et al., the disclosure of each being incorporated herein by reference.

DAA circuit 110 of FIG. 7 includes two integrated circuits (ICs), a capacitive isolation barrier 120, and may be coupled to phone line TIP and RING lines as shown. In the illustrated embodiment of FIG. 7, powered side circuitry 116 may include a powered side IC 1902A, and telephone line side circuit 118 may include a phone line side IC 1902B. External discrete devices may be coupled to the TIP line, RING line, phone line side IC 1902B and powered side IC 1902A. The external circuitry may include circuitry, such as hookswitch circuitry and diode bridge circuitry 1906.

In the exemplary DAA circuitry embodiment depicted in FIG. 7, external pins 1909 of the powered side IC 1902A are connected to an external digital signal processor (DSP) and/or to an external application specific IC (ASIC) or controller. The isolation barrier 120 includes a first barrier capacitor (C1) connecting an external signal (C1A) pin on the powered side IC 1902A to an external signal (C1B) pin on the phone line side IC 1902B. In addition, the isolation barrier 120 has a second barrier capacitor (C2) connecting an external signal (C2A) pin on the powered side IC 1902A to an external signal (C2B) pin on the phone line side IC 1902B. In the embodiment of FIG. 7, differential signals across capacitors C1 and C2 may be used to communicate between IC 1902A and IC 1902B. The ground (GND) pin of powered side IC 1902A may be connected to the system digital ground. Regulator voltage reference (VA) pin of powered side IC 1902A may be connected to external capacitor C51 and serve as the reference for the internal voltage regulator. Digital supply voltage (VDD) pin may be present on powered side IC 1902A to provide digital supply voltage (e.g., 3.3 V) to powered side IC 1902A. In addition, the isolated ground (IGND) pin of phone line side IC 1902B may be connected to a node within diode circuitry 1906 (and thereby be connected to the phone line). Also shown is external line side capacitor C3 that is coupled between tip and ring of telephone line side circuit 118 and phone line side IC 1902B, with diodes of diode bridge circuitry 1906 being coupled between the tip and ring and external line side capacitor C3. In one exemplary embodiment, external line side capacitor C3 may be a capacitor having a breakdown voltage of about 300 volts, although capacitors having other breakdown voltage values are possible in other embodiments. Typical component values for the various external capacitors, resistors, transistors, and diodes for exemplary DAA circuit of FIG. 7 are shown in Table 1. The identity and values of the components listed in Table 1 are exemplary only, and it will be understood that benefits of the disclosed surge clamp systems and methods may be practiced with different combinations of components and/or values thereof.

TABLE 1

External Component Values for DAA Circuit of FIG. 7

| Component | Value |
|---|---|
| C1, C2 | 33 pF, Y2, X7R, ±20% |
| C3 | 3.9 nF, 250 V, X7R, ±20% |

TABLE 1-continued

External Component Values for DAA Circuit of FIG. 7

| Component | Value |
|---|---|
| C4 | 1.0 uF, 50 V, Elec/Tant, ±20% |
| C5, C6, C50, C51 | 0.1 uF, 16 V, X7R, ±20% |
| C7 | 2.7 nF, 50 V, X7R, 20% |
| C8, C9 | 680 pF, Y2, X7R, ±10% |
| C10 | 0.01 uF, 16 V, X7R, ±20% |
| D1, D2 | Dual Diode, 225 mA, 300 V, CMPD2004 |
| FB1, FB2 | Ferrite Bead, BLM31A601S |
| Q1, Q3 | NPN, 300 V, MMBTA42 |
| Q2 | PNP, 300 V, MMBTA92 |
| Q4, Q5 | NPN, 60 V, 330 mW, MMBT2484 |
| RV1 | Sidactor, 275 V, 100 A |
| R1 | 1.07 KΩ, ½ W, 1% |
| R2 | 150 Ω, ¹⁄₁₆ W, 5% |
| R3 | 4.75 KΩ, ¼ W, 1% |
| R4 | 2.49 KΩ, ½ W, 1% |
| R5, R6 | 100 KΩ, ¹⁄₁₆ W, 5% |
| R7, R8 | 20 MΩ, ¹⁄₁₆ W, 5% |
| R9 | 1 MΩ, ¹⁄₁₆ W, 1% |
| R10 | 536 Ω, ¼ W, 1% |
| R11 | 64.9 Ω, ½ W, 1% |
| R51, R52, R53, R54, R55 | 4.7 KΩ, ¹⁄₁₀ W, 5% |
| Z1 | Zener Diode, 43 V, ½ W, ZMM43 |

As illustrated and described with respect to DAA circuitry of FIG. 3, one or more surge protection circuits may be included in exemplary DAA circuitry 110 of FIG. 7 that act to limit the peak voltage across certain circuit components that would otherwise fail during transient conditions if not protected. As shown in the embodiment of FIG. 7, DAA circuit 110 includes surge protection section 1950 that corresponds in function to section 1850 of FIG. 3, although section 1950 employs two high voltage capacitors (C8 and C9) rather than four. Not shown in FIG. 7 is a surge protection section corresponding to section 1852 of FIG. 3. In this regard, surge clamp circuit 600 is integrated into IC 1902B of the embodiment of FIG. 7 to perform a voltage clamping function, e.g., eliminating the need for relatively expensive varistor RV2 as it is employed in the DAA circuit of FIG. 3. Advantageously, replacement of varistor RV2 with integrated surge clamp circuit 600 reduces the cost and space requirements of DAA circuit 110 of FIG. 7.

Returning to FIG. 6, surge clamp circuit 600 may be integrated into phone line side IC 1902B of DAA circuit 110 of FIG. 7, and is shown having components coupled to pin connections SC, DCT2, QE, QE2, C1B and C2B of phone line side IC 1902B. Also shown are external barrier capacitors C1 and C2, which are coupled to pin connections C1B and C2B. As shown in FIG. 6, surge clamp circuit 600 includes four transistors (M1, M2, M3 and M4). Although illustrated as transistors, M1 and M4 are employed to provide a uni-directional current path, and may be implemented using diodes or any other uni-directional current device if so desired. As will be further explained, transistors M1, M3 and M4 of FIG. 6 operate together during on-hook mode to activate hookswitch circuitry of FIG. 7 in order to clamp voltage across external line side capacitor C3 during a multi-transient event (e.g., lightning strike), limiting voltage buildup due to charge pumping. Transistor M2 acts to ground external line side capacitor C3 during off-hook mode. Thus, transistors M1, M3 and M4 are the components of illustrated surge clamp circuit 600 that actually participate in clamping voltage buildup across external line side capacitor C3 that occurs due to charge pumping during multi-transient events. Typical component values for the various capacitors, resistors, and transistors for exemplary surge clamp circuit 600 of FIG. 6 are shown in Table 2. The identity and values of the components listed in Table 2 are exemplary only, and it will be understood that benefits of the disclosed surge clamp systems and methods may be practiced with different combinations of components and/or values thereof.

TABLE 2

Surge Clamp Circuitry Component Values

| Symbol | Value |
|---|---|
| M1 | 60 μ/2 μ |
| M2 | 2100 μ/0.8 μ |
| M3 | 120 μ/0.8 μ |
| M4 | 60 μ/1 μ |
| R102 | 400 kΩ |
| C100 | 6 pF |
| C102 | 6 pF |
| R104 | 10 Ω |
| R106 | 500 Ω |
| R108 | 25 Ω |
| R110 | 25 Ω |
| D100 | Part of ESD Protection Circuit |
| D102 | Part of ESD Protection Circuit |

In the exemplary embodiment of FIG. 6, the gate and drain of each of transistors M1 and M4 are coupled to pin connection SC of phone line side IC 1902B, which in turn may be coupled to external line side capacitor C3 of DAA circuit 110. The source of transistor M1 is coupled to capacitor C100 and pin connection DCT2 as shown. Pin connection DCT2 may in turn be coupled to the base of switch transistor Q3 of FIG. 7, with capacitor C100 being coupled to ground as shown in FIG. 6. The source of transistor M4 is coupled to capacitor C102, resistor R102 and the gate of transistor M3 as shown. Capacitor C102 and resistor R102 are in turn coupled to ground as shown. The drain of transistor M3 is coupled to pin connection QE, which in turn may be coupled to the emitter of switch transistor Q3 of FIG. 7. The source of transistor M3 is coupled to ground as shown in FIG. 6. The drain of transistor M2 is coupled to pin connection SC of phone line side IC 1902B, which may in turn be coupled to external line side capacitor C3 of DAA circuit 110, and the gate of transistor M2 is coupled to receive an off-hook status signal generated when DAA circuitry is instructed to enter the off-hook mode. The source of transistor M2 is coupled to ground as shown in FIG. 6. Resistor R104 is shown between connection pin QE2 and remainder of surge clamp circuit 600.

Still referring to FIGS. 6 and 7, when DAA circuit 110 is instructed to go into off-hook mode, transistor M2 is turned on by an off-hook signal that is generated to the gate of transistor M2, thus grounding external line side capacitor C3 via pin connection SC. When DAA circuit 110 is in on-hook mode, no off-hook signal is generated to the gate of transistor M2 and transistor M2 is turned off, allowing the SC pin to function as a surge detection pin and enabling surge clamp circuit 600 to operate in the event of a transient event occurrence creating the potential for voltage buildup across external line side capacitor C3 due to charge pumping from multi-transient events. In the on-hook mode, resistor R102 keeps hookswitch circuitry in the OFF state by forming a path to bleed off any charge accumulated by capacitor C102 during on-hook mode.

In one exemplary embodiment of the disclosed systems and methods, a longitudinal surge event may occur as follows. When DAA circuit 110 of FIG. 7 is in on-hook mode and a longitudinal surge event (e.g., such as lightning strike) occurs between the tip and ring wires of DAA circuit 110 and ground, the surge takes a path through diodes of diode bridge circuit 1906 and external line side capacitor C3 of FIG. 7 to pin connection SC, and lifts up voltage of negative supply rail (nsup) of phone line side IC 1902B. In doing so, ESD diodes D100 and D102 in the output drivers associated with the C1B and C2B pins are forward-biased so that current may flow out the C1B and C2B pins, through barrier capacitors C1 and C2, and ultimately through a path to earth ground through powered side IC 1902A and out powered side IC 1902A through connection pin GND. At the same time, presence of the voltage surge at connection pin SC provides gate voltage to turn on transistors M1 and M4 of FIG. 6, causing current to flow through transistors M1 and M4 to charge capacitors C100 and C102. Turning on transistor M4 also provides voltage to the gate of transistor M3 of FIG. 6, and turning on transistor M1 also provides current to the base of transistor Q3 of FIG. 7 through pin connection DCT2. Presence of voltage at the gate of transistor M3 of FIG. 6 turns on transistor M3 and grounds the emitter of transistor Q3 of FIG. 7, while at the same time providing current at the base of transistor Q3, together creating a voltage across the base and emitter ($V_{BE}$) of Q3 that is sufficient to turn on switch transistor Q3.

When switch transistor Q3 of FIG. 7 is activated, it turns on switch transistor Q2 by connecting the base of transistor Q2 to ground through connection pin QE and activated surge clamp circuit transistor M3. As shown in FIG. 7, the collector of switch transistor Q2 is coupled to the base of each of switch transistors Q1 and Q4. Thus, when switch transistor Q2 is activated, it turns on switch transistors Q1 and Q4 which complete a capacitor discharge path for stored charge from the hookswitch side plate of external line side capacitor C3 to the SC pin side plate of external line side capacitor C3 through connection pin QE2, resistor R106, and connection pin SC. In the manner described above, components of hookswitch circuitry may be activated or turned on to form such a capacitor discharge path with each transient pulse of a multi-transient longitudinal event. By so providing a capacitor discharge path between the opposite plates of external line side capacitor C3 with each transient pulse, the build up of stored charge across external line side capacitor C3 due to multi-transient events is limited and voltage across external line side capacitor C3 effectively clamped to safe levels.

Referring again to FIG. 6, when the longitudinal surge event (e.g., such as lightning strike) is over, charge held by surge clamp circuit capacitor C100 continues to provide base current for switch transistor Q3 and charge held by surge clamp circuit capacitor C102 continues to provide gate voltage for surge clamp circuit transistor M3, together keeping switch transistor Q3 activated for a sufficient period of time to maintain the capacitor discharge path between the opposite plates of external line side capacitor C3. Grounded surge clamp resistor R102 is present to turn off the hookswitch after the surge event is over. Surge clamp circuit transistors M1 and M4 are present to act as diodes that prevent the negative voltage pulse across external line side capacitor C3 that occurs during discharge through the capacitor discharge path created between the opposite plates of external line side capacitor C3 from turning off switch transistor Q3.

Figure 8:
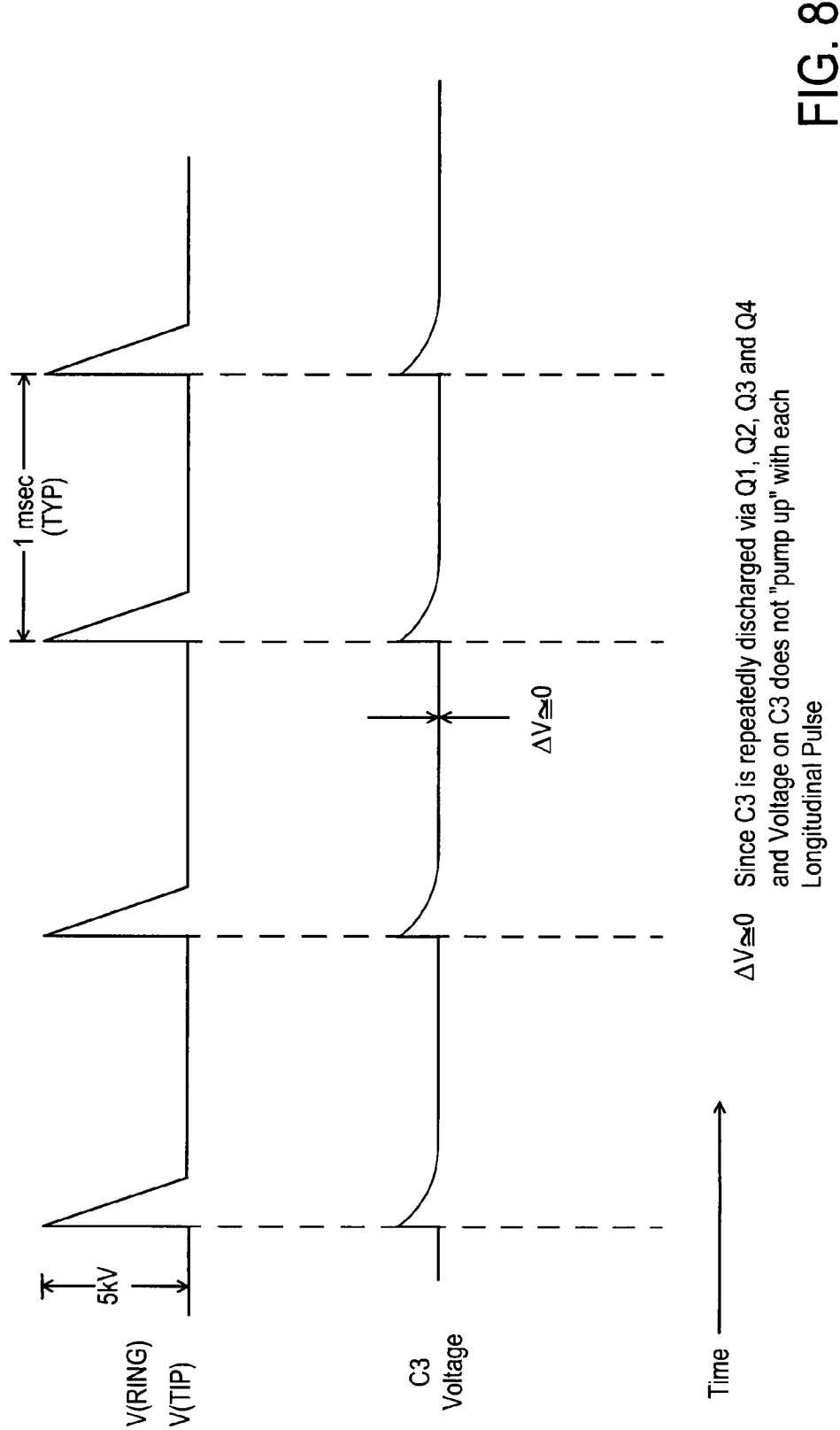
FIG. 8 illustrates voltage waveform behavior during a multi-transient longitudinal event for the combined components of the circuits of FIGS. 6 and 7 according to one embodiment of the disclosed systems and methods.

FIG. 8 illustrates waveform behavior for the combined components of surge clamp circuit 600 and hookswitch circuitry of FIGS. 6 and 7 during a multi-transient longitudinal event such as lightning strike. As illustrated in FIG. 8, for each transient 5 kV pulse a corresponding ΔV of 75V may result, but is discharged before the next transient 5 kV pulse occurs by the capacitor discharge path that is created as described above. Significantly, after four 5 kV pulses, a resulting Veq of about 0V exists across external line side capacitor C3 due to repeated discharge of external line side capacitor C3 via the capacitor discharge path. Thus, incorporation of surge clamp circuit 600 into DAA circuit 110 advantageously clamps the voltage across external line side capacitor C3 during multi-transient longitudinal events without the cost or space requirements of a varistor device, such as varistor RV2 used in prior art DAA circuit of FIG. 3. It will be understood that the waveforms of FIG. 8 are exemplary only, and that components of the disclosed surge clamp circuit may be selected to fit the needs of a particular application, e.g., in view of the operating characteristics of a given DAA circuit and components thereof. For example, a surge clamp circuit may be configured to clamp or limit the ΔV developed across one or more capacitors during a multi-transient longitudinal event to a maximum value that is within the operating range of components (e.g., transistors) of the DAA circuit exposed to the ΔV across the capacitor/s.

In one exemplary embodiment, one or more components of the disclosed surge clamp circuitry may be configured to adjust clamping sensitivity so that DAA hookswitch circuitry is only activated or turned on upon occurrence of transient events producing a threshold current to ground, e.g., via pin connections C1B and C2B. In one possible implementation of such an embodiment, surge detection and hookswitch activation circuitry may be included that is configured to detect the occurrence of a longitudinal surge event above a threshold current value, and to activate one or more components of the hook-switch circuitry upon detection of the occurrence of such a longitudinal surge event above the threshold current value.

For example, referring again to FIG. 6, the resistance value of surge clamp resistor R106 may be adjusted relative to the combined capacitance of barrier capacitors C1 and C2 in order to control the magnitude of current required to flow from pin connection SC to ground (i.e., via pin connections C1B and C2B) to produce the necessary voltage to activate surge clamp circuit 600 and turn on hookswitch circuitry to clamp voltage in the manner previously described. In this regard, the threshold voltage required to activate surge clamp circuit 600 may be characterized as voltage in excess of about 5 volts. At the same time, the voltage produced from pin connection SC to ground across surge clamp resistor R106 and barrier capacitors C1 and C2 during a transient event may be characterized by the equation $V=IR_{106}$, where I may be approximated in this embodiment by $(C_1+C_2)dv/dt$. Using this relationship, the resistance of R106 may be chosen to be small enough so that transient events related to contingency operation signals (e.g., billing tones, ringing signals, etc.) do not activate surge clamp circuit 600, but large enough so that surge clamp circuit 600 is activated by transient events capable of generating potentially dangerous voltages by virtue of charge pumping phenomenon. For example, in one exemplary embodiment where external line side capacitor C3 has a capacitance value of about 5 nF, C1 and C2 together may have an effective capacitance value of about 100 pF, and R106 may have a resistance value of about 500 ohms. Alternatively, R106 may have a resistance of about 1000 ohms and a separate about 1000 ohm resistor (not shown) may be placed in parallel with R106 to achieve a resulting resistance value of about 500 ohms.

Although described herein with respect to the exemplary embodiment of FIGS. 6 and 7, it will be understood that the disclosed surge clamp circuit and method for use therefor may be employed in any circuit configuration to clamp voltage across one or more capacitors that results from charge trapped across the capacitor/s due to a longitudinal surge event. In this regard, it will be understood that the typical internal and external component values disclosed herein are exemplary only. Furthermore, in the practice of the disclosed surge clamp circuitry and methods of use therefor, the number, type and/or configuration of internal and/or external components (e.g., resistors, diodes, transistors, capacitors, etc.) may be varied to achieve a surge clamp circuit that is configured to activate one or more components of a DAA hookswitch circuit to discharge any voltage present across one or more capacitors of phone line circuitry of a DAA circuit that occurs due to a longitudinal surge event. For example, it will be understood that in other embodiments the disclosed systems and methods may be practiced with DAA circuitry having only one barrier capacitor, having more than two barrier capacitors, having isolation elements other than capacitors, and/or having a longitudinal surge path from the disclosed surge clamp circuit to ground that differs from the exemplary ground path described and illustrate herein.

It will be understood with benefit of this disclosure that common nodes may be employed in the practice of the disclose systems and methods, e.g., surge clamp circuit 600 may share nodes with other functional circuitry of DAA circuit 110 that may be powered down during on hook mode. In such an embodiment, additional and optional auxiliary circuitry may be present (e.g., integrated with surge clamp circuit 600) that is capable of ensuring that nodes of the functional circuitry stay in their desired state and do not float to an undesired state, i.e., a state that could interfere with operation of surge clamp circuit 600 during on-hook mode.

In the embodiment illustrated in FIGS. 6 and 7, surge clamp circuit 600 is shown integrated into a phone line side IC of DAA circuitry, in this case phone line side IC 1902B of DAA circuitry of FIG. 7. However, it will be understood that in other embodiments the disclosed surge clamp circuitry may be implemented in any manner suitable for activating one or more hookswitch circuitry components of a DAA circuit to form a capacitor discharge path to limit voltage buildup across one or more capacitors, e.g., as circuitry external to a phone line IC, as circuitry partially integrated into a phone line IC and partially external to the phone line IC, etc. Furthermore, it will be understood that the disclosed surge clamp circuit may be implemented using any combination of circuitry suitable for activating one or more hookswitch circuitry components of a DAA circuit to form a capacitor discharge path to limit voltage buildup across one or more capacitors, for example any circuit configuration capable of turning on switch transistor Q3 (e.g., any circuit configuration capable of coupling a longitudinal voltage surge to base of switch transistor Q3) to activate the hookswitch circuitry to form a capacitor discharge path. However, other components may be optionally present within the disclosed surge clamp circuit as necessary or desired to fit particular applications or to achieve particular capabilities. Such optional components include, but are not limited to, components described herein such as surge clamp capacitors C100 and C102, surge clamp resistors R102, R104 and R106, surge clamp transistors or diodes M1 and M4, surge clamp transistors M2 and M3, etc.

Although described and illustrated with one illustrative embodiment of DAA circuitry, it will be understood that the disclosed surge clamp circuit may be used with other DAA circuit configurations including, but not limited to, capacitance isolation DAA circuits described and illustrated in U.S. Pat. No. 6,385,235 and in U.S. patent application Ser. No. 09/347,688 filed Jan. 2, 1999 and entitled "DIGITAL ACCESS ARRANGEMENT CIRCUITRY AND METHOD HAVING A SYNTHESIZED RINGER IMPEDANCE FOR CONNECTING TO PHONE LINES" by Tuttle et al., the disclosure of each being incorporated herein by reference. Other examples of DAA circuit types with which the disclosed surge clamp circuit may be employed include, but are not limited to, DAA circuits that do not utilize capacitance isolation as would be recognized by those of skill in the art with benefit of this disclosure.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention. Moreover, the various aspects of the inventions disclosed herein may be used in combination or separately as will also be apparent to those skilled in the art.

We claim:

1. A communication system, comprising:
   phone line side circuitry that is configured to be coupled to a telephone network, said phone line circuitry including hookswitch circuitry and at least one capacitor; and
   surge clamp circuitry within the phone line side circuitry, the surge clamp circuitry being configured to activate one or more components of said hookswitch circuitry upon occurrence of a longitudinal surge event to discharge any voltage present across said at least one capacitor;
   wherein said surge clamp circuitry is configured to activate said one or more components of said hookswitch circuitry only when said longitudinal surge event exceeds a threshold current value; and
   wherein said surge clamp circuitry is configured to selectively activate one or more components of said hookswitch circuitry only when said longitudinal surge event produces a current to ground through said surge clamp circuitry that exceeds a selected threshold current value.

2. A communication system, comprising:
   phone line side circuitry that is configured to be coupled to a telephone network, said phone line circuitry including hookswitch circuitry and at least one capacitor; and
   surge clamp circuitry within the phone line side circuitry, the surge clamp circuitry being configured to activate one or more components of said hookswitch circuitry upon occurrence of a longitudinal surge event to discharge any voltage present across said at least one capacitor;
   wherein said surge clamp circuitry is configured to activate said one or more components of said hookswitch circuitry only when said longitudinal surge event exceeds a threshold current value;
   wherein said phone line circuitry has tip and ring nodes for coupling to tip and ring nodes of a phone line system; wherein said phone line circuitry further comprises a phone line side integrated circuit that comprises said surge clamp circuitry; and wherein said at least one capacitor comprises an external capacitor coupled between said tip and ring nodes of said phone line circuitry and said phone line integrated circuit;
   wherein said phone line circuitry further comprises external diode bridge circuitry coupled between said tip and ring nodes of said phone line circuitry and said at least one capacitor; and
   wherein said hookswitch circuitry is external to said phone line side integrated circuit; wherein said surge clamp circuitry is coupled between said at least one capacitor and ground; and wherein said surge clamp circuitry is configured to activate one or more components of said hookswitch circuitry to discharge any voltage present across said at least one capacitor upon discharge of at least a portion of said longitudinal surge event through said surge clamp circuitry to said ground.

3. The communication system of claim 2, further comprising powered side circuitry coupled to the phone line side circuitry through an isolation barrier, said surge clamp circuitry being coupled between said at least one capacitor and said isolation barrier, and said isolation barrier being coupled between said surge clamp circuitry and said ground.

4. The communication system of claim 3, wherein said isolation barrier comprises a capacitive barrier coupled between the phone line side circuitry and the powered side circuitry.

5. The communication system of claim 4, wherein said longitudinal surge event comprises a multi-transient event; and wherein said voltage present across said at least one capacitor comprises voltage induced by charge pumping action caused by two or more transient pulses of said multi-transient event through said diode bridge and said at least one capacitor.

6. The communication system of claim 5, wherein said multi-transient longitudinal surge event results from a lightning strike.

7. A method of operating a communication system that is configured to be coupled to a telephone network, comprising:
   providing phone line side circuitry, said phone line circuitry including hookswitch circuitry and at least one capacitor; and
   activating one or more components of said hookswitch circuitry upon occurrence of a longitudinal surge event to discharge any voltage present across said at least one capacitor;
   wherein said hookswitch is activated only when said longitudinal surge event exceeds a threshold current value;
   wherein said phone line circuitry has tip and ring nodes for coupling to tip and ring nodes of a phone line system, and further comprises:
   external diode bridge circuitry coupled to said tip and ring nodes of said phone line circuitry, a phone line side integrated circuit being coupled to said external diode bridge circuitry, and wherein said at least one capacitor comprises at least one external capacitor coupled between said diode bridge circuitry and said phone line integrated circuit; and wherein said step of activating said hookswitch circuitry comprises selectively activating one or more components of said hookswitch circuitry only when said longitudinal surge event produces a current to ground through said phone line integrated circuit that exceeds a selected threshold current value.

8. A method of operating a communication system that is configured to be coupled to a telephone network, comprising:

providing phone line side circuitry, said phone line circuitry including hookswitch circuitry and at least one capacitor; and activating one or more components of said hookswitch circuitry upon occurrence of a longitudinal surge event to discharge any voltage present across said at least one capacitor;

wherein said hookswitch is activated only when said longitudinal surge event exceeds a threshold current value;

wherein said phone line circuitry has tip and ring nodes for coupling to tip and ring nodes of a phone line system, and further comprises:

external diode bridge circuitry coupled to said tip and ring nodes of said phone line circuitry, a phone line side integrated circuit being coupled to said external diode bridge circuitry, and wherein said at least one capacitor comprises at least one external capacitor coupled between said diode bridge circuitry and said phone line integrated circuit; and wherein said phone line integrated circuit comprises surge clamp circuitry configured to activate one or more components of said hookswitch circuitry upon occurrence of a longitudinal surge event to discharge any voltage present across said at least one capacitor; and wherein said method comprises using said surge clamp circuitry to perform said step of activating.

9. The method of claim 8, wherein said hookswitch circuitry is external to said phone line side integrated circuit; wherein said surge clamp circuitry is coupled between said at least one capacitor and ground; wherein said surge clamp circuitry is configured to activate one or more components of said hookswitch circuitry to discharge any voltage present across said at least one capacitor upon discharge of at least a portion of said longitudinal surge event through said surge clamp circuitry to said ground; and wherein said method comprises using said surge clamp circuitry to perform said step of activating.

10. The method of claim 9, further comprising coupling an isolation barrier between powered side circuitry and said phone line side circuitry so that said surge clamp circuitry is coupled between said at least one capacitor and said isolation barrier, and so that said isolation barrier is coupled between said surge clamp circuitry and said ground.

11. The method of claim 10, wherein said isolation barrier comprises a capacitive barrier coupled between the phone line side circuitry and the powered side circuitry.

12. The method of claim 11, wherein said longitudinal surge event comprises a multi-transient event; and wherein said voltage present across said at least one capacitor comprises voltage induced by charge pumping action caused by two or more transient pulses of said multi-transient event through said diode bridge and said at least one capacitor.

13. The method of claim 12, wherein said multi-transient longitudinal surge event results from a lightning strike.

14. A surge clamp circuit within phone line side circuitry of a communication system that is configured to be connected to a telephone network, the surge clamp circuit comprising:

a first surge clamp node configured to be coupled between a first node of said phone line circuitry and ground, said first node of said phone line circuitry being a first plate of at least one capacitor of said phone line circuitry;

a second surge clamp node coupled to said first surge clamp node and configured to be coupled to a second node of said phone line circuitry, said second node of said phone line circuitry being configured to activate a hookswitch circuit of said phone line circuitry to discharge any voltage present across said first plate and a second plate of said at least one capacitor upon the application of current from said second node of said surge clamp circuit to said first node of said phone line circuitry; and wherein said second node of said surge clamp circuit is configured to apply current to said second node of said phone line circuitry upon occurrence of a longitudinal surge event between said first node of said phone line circuitry and said ground.

15. The surge clamp circuit of claim 14, wherein said second node of said surge clamp circuit is configured to be coupled to one or more switch transistors of said hookswitch circuitry and is configured to activate said one or more switch transistors of said hookswitch circuit by applying current to said second node of said phone line circuitry.

16. The surge clamp circuit of claim 15, wherein said second node of said phone line circuitry comprises a base of a first switch transistor that is coupled to one or more transistors of said hookswitch circuit, said first switch transistor being configured to activate said hookswitch circuit by activating one or more of said switch transistors of said hookswitch circuit upon the application of current from said second node of said surge clamp circuit to said second node of said phone line circuitry.

17. The surge clamp circuit of claim 16, further comprising a third surge clamp node coupled to said first and second surge clamp nodes and configured to be coupled between a third node of said phone line circuitry and ground, said third node of said phone line circuitry being an emitter of said first switch transistor; wherein said third surge clamp node is configured to ground said third node of said phone line circuitry upon occurrence of a longitudinal surge event between said at least one capacitor of said phone line circuitry and ground; and wherein said first switch transistor is further configured to activate said hookswitch circuit upon the application of current from said second node of said surge clamp circuit to said second node of said phone line circuitry in combination with grounding of said third node of said phone line circuitry by said third node of said surge clamp circuit.

18. The surge clamp circuit of claim 15, further comprising a fourth surge clamp node configured to be coupled between ground and said first, second and third surge clamp nodes.

19. The surge clamp circuit of claim 18, wherein said fourth surge clamp node is configured to be coupled between an isolation barrier and said first, second and third surge clamp nodes; wherein said isolation barrier is coupled between said phone line circuitry and powered side circuitry; and wherein said powered side circuitry is coupled to ground.

20. The surge clamp circuit of claim 19, wherein said isolation barrier comprises a comprises a capacitive barrier.

21. The surge clamp circuit of claim 18, further comprising a fifth surge clamp node configured to be coupled between said fourth surge clamp node and a fourth node of said phone line circuitry, said fourth node of said phone line circuitry being said second plate of said at least one capacitor; and wherein said hookswitch circuitry is configured to couple said first node of said phone line circuitry to said fourth node of said phone line circuitry when activated to discharge any voltage present across said first plate and a second plate of said at least one capacitor.

22. The surge clamp circuit of claim 14, wherein said second and third surge clamp nodes each comprise unidirectional current paths configured to provide one way current flow from said first surge clamp node to said respective second and third nodes of said phone line circuitry upon occurrence of a longitudinal surge event between said first node of said phone line circuitry and ground.

23. The surge clamp circuit of claim 14, wherein said second node of said surge clamp circuit is configured to selectively apply current to said second node of said phone line circuitry only upon occurrence of a longitudinal surge event between said first node of said phone line circuitry and said ground that produces a current to ground that exceeds a selected threshold current value.

24. The surge clamp circuit of claim 14, wherein said longitudinal surge event comprises a multi-transient event; and wherein said voltage present across said first and second plates of said at least one capacitor comprises voltage induced by charge pumping action caused by two or more transient pulses of said multi-transient event through a diode bridge of said phone line circuitry coupled to said second plate of said at least one capacitor.

25. The surge clamp circuit of claim 24, wherein said multi-transient longitudinal surge event results from a lightning strike.

26. A communication system, comprising:
phone line circuitry that is configured to be coupled to a telephone network, said phone line circuitry including hook-switch circuitry; and
surge detection and hookswitch activation circuitry within said phone line circuitry, said surge detection and hookswitch activation circuitry being configured to detect the occurrence of a longitudinal surge event above a threshold current value and to activate one or more components of said hook-switch circuitry upon detection of the occurrence of said longitudinal surge event above said threshold current value.

27. The communication system of claim 26, wherein said phone line side circuitry further comprises a phone line side integrated circuit that comprises said surge detection and hookswitch activation circuitry; and wherein said hook switch circuitry comprises discrete circuitry that is external to said phone line side integrated circuitry.

28. The communication system of claim 26, wherein said phone line circuitry further comprises at least one capacitor; and wherein said surge detection and hookswitch activation circuitry is configured to activate one or more components of said hook-switch circuitry to discharge any voltage present across said at least one capacitor upon detection of the occurrence of said longitudinal surge event above said threshold current value.

29. The communication system of claim 28, wherein said phone line circuitry further comprises a diode bridge, and wherein said at least one capacitor is coupled to said diode bridge.

30. The communication system of claim 28, wherein said phone line circuitry has tip and ring nodes for coupling to tip and ring nodes of a phone line system; wherein said phone line circuitry further comprises a phone line side integrated circuit that comprises said surge detection and hookswitch activation circuitry; and wherein said at least one capacitor comprises an external capacitor coupled between said tip and ring nodes of said phone line circuitry and said phone line integrated circuit.

31. The communication system of claim 30, wherein said phone line circuitry further comprises external diode bridge circuitry coupled between said tip and ring nodes of said phone line circuitry and said at least one capacitor.

32. A method of operating hookswitch circuitry within phone line circuitry that is configured to be coupled to a telephone network, comprising:
detecting the occurrence of a longitudinal surge event above a threshold current value; and
activating one or more components of said hook-switch circuitry within said phone line circuitry upon detection of the occurrence of said longitudinal surge event above said threshold current value.

33. The method of claim 32, wherein said phone line side circuit comprises a phone line side integrated circuit configured to detect the occurrence of said longitudinal surge event and to activate one or more components of said hook-switch circuitry; and wherein said hook switch circuitry comprises discrete circuitry that is external to said phone line side integrated circuitry.

34. The method of claim 32, wherein said phone line circuitry further comprises at least one capacitor; and wherein said method further comprises activating one or more components of said hook-switch circuitry to discharge any voltage present across said at least one capacitor upon detection of the occurrence of said longitudinal surge event above said threshold current value.

35. The method of claim 34, wherein said phone line circuitry comprises a diode bridge, and wherein said at least one capacitor is coupled to said diode bridge.

36. The method of claim 34, wherein said phone line circuitry has tip and ring nodes for coupling to tip and ring nodes of a phone line system, and further comprises:
external diode bridge circuitry coupled to said tip and ring nodes of said phone line circuitry;
a phone line side integrated circuit being coupled to said external diode bridge circuitry; and
wherein said at least one capacitor comprises at least one external capacitor coupled between said diode bridge circuitry and said phone line integrated circuit.

37. A communication system, comprising:
phone line side circuitry that is configured to be coupled to a telephone network, said phone line circuitry including hookswitch circuitry and at least one capacitor; and
surge clamp circuitry within the phone line side circuitry, the surge clamp circuitry being configured to activate one or more components of said hookswitch circuitry upon occurrence of a longitudinal surge event to discharge any voltage present across said at least one capacitor;
wherein said phone line circuitry has tip and ring nodes for coupling to tip and ring nodes of a phone line system; wherein said phone line circuitry further comprises a phone line side integrated circuit that comprises said surge clamp circuitry; and wherein said at least one capacitor comprises an external capacitor coupled between said tip and ring nodes of said phone line circuitry and said phone line integrated circuit;

wherein said phone line circuitry further comprises external diode bridge circuitry coupled between said tip and ring nodes of said phone line circuitry and said at least one capacitor;

wherein said hookswitch circuitry is external to said phone line side integrated circuit; wherein said surge clamp circuitry is coupled between said at least one capacitor and ground; and wherein said surge clamp circuitry is configured to activate one or more components of said hookswitch circuitry to discharge any voltage present across said at least one capacitor upon discharge of at least a portion of said longitudinal surge event through said surge clamp circuitry to said ground; and said communication system further comprising powered side circuitry coupled to the phone line side circuitry through an isolation barrier, said surge clamp circuitry being coupled between said at least one capacitor and said isolation barrier, and said isolation barrier being coupled between said surge clamp circuitry and said ground.

38. The communication system of claim 37, wherein said isolation barrier comprises a capacitive barrier coupled between the phone line side circuitry and the powered side circuitry.

39. The communication system of claim 38, wherein said longitudinal surge event comprises a multi-transient event; and wherein said voltage present across said at least one capacitor comprises voltage induced by charge pumping action caused by two or more transient pulses of said multi-transient event through said diode bridge and said at least one capacitor.

40. The communication system of claim 39, wherein said multi-transient longitudinal surge event results from a lightning strike.

41. A method of operating a communication system that is configured to be coupled to a telephone network, comprising:

providing phone line side circuitry, said phone line circuitry including hookswitch circuitry and at least one capacitor; and activating one or more components of said hookswitch circuitry upon occurrence of a longitudinal surge event to discharge any voltage present across said at least one capacitor;

wherein said phone line circuitry has tip and ring nodes for coupling to tip and ring nodes of a phone line system, and further comprises:

external diode bridge circuitry coupled to said tip and ring nodes of said phone line circuitry, a phone line side integrated circuit being coupled to said external diode bridge circuitry, and wherein said at least one capacitor comprises at least one external capacitor coupled between said diode bridge circuitry and said phone line integrated circuit; and wherein said phone line integrated circuit comprises surge clamp circuitry configured to activate one or more components of said hookswitch circuitry upon occurrence of a longitudinal surge event to discharge any voltage present across said at least one capacitor; and wherein said method comprises using said surge clamp circuitry to perform said step of activating; and wherein said hookswitch circuitry is external to said phone line side integrated circuit; wherein said surge clamp circuitry is coupled between said at least one capacitor and ground; wherein said surge clamp circuitry is configured to activate one or more components of said hookswitch circuitry to discharge any voltage present across said at least one capacitor upon discharge of at least a portion of said longitudinal surge event through said surge clamp circuitry to said ground; and wherein said method comprises using said surge clamp circuitry to perform said step of activating.

42. The method of claim 41, further comprising coupling an isolation barrier between powered side circuitry and said phone line side circuitry so that said surge clamp circuitry is coupled between said at least one capacitor and said isolation barrier, and so that said isolation barrier is coupled between said surge clamp circuitry and said ground.

43. The method of claim 42, wherein said isolation barrier comprises a capacitive barrier coupled between the phone line side circuitry and the powered side circuitry.

44. The method of claim 43, wherein said longitudinal surge event comprises a multi-transient event; and wherein said voltage present across said at least one capacitor comprises voltage induced by charge pumping action caused by two or more transient pulses of said multi-transient event through said diode bridge and said at least one capacitor.

45. The method of claim 44, wherein said multi-transient longitudinal surge event results from a lightning strike.

* * * * *

UNITED STATES PATENT AND TRADEMARK OFFICE
CERTIFICATE OF CORRECTION

PATENT NO. : 7,266,195 B1 Page 1 of 1
APPLICATION NO. : 10/379367
DATED : September 4, 2007
INVENTOR(S) : Dupuis et al.

It is certified that error appears in the above-identified patent and that said Letters Patent is hereby corrected as shown below:

In claim 20, column 21, line 5, delete first instance of "comprises a".

Signed and Sealed this

Twentieth Day of November, 2007

JON W. DUDAS
*Director of the United States Patent and Trademark Office*